(12) United States Patent
Savintsev et al.

(10) Patent No.: US 10,805,271 B2
(45) Date of Patent: Oct. 13, 2020

(54) METHOD AND SYSTEM FOR INTRUSION DETECTION AND PREVENTION

(71) Applicant: Oath Inc., New York, NY (US)

(72) Inventors: Dmitry Savintsev, Ottobrunn (DE); Bishan Singh Kochar, Santa Clara, CA (US); Aditya Mahendrakar, San Jose, CA (US); Jason Fesler, Sunnyvale, CA (US)

(73) Assignee: Oath Inc., New York, NY (US)

( * ) Notice: Subject to any disclaimer, the term of this patent is extended or adjusted under 35 U.S.C. 154(b) by 313 days.

(21) Appl. No.: 15/857,776

(22) Filed: Dec. 29, 2017

(65) Prior Publication Data

US 2019/0207907 A1    Jul. 4, 2019

(51) Int. Cl.
*G06F 21/00*     (2013.01)
*H04L 29/06*     (2006.01)
*H04L 12/721*    (2013.01)

(52) U.S. Cl.
CPC .......... *H04L 63/0263* (2013.01); *H04L 45/72* (2013.01); *H04L 63/0218* (2013.01); *H04L 63/0236* (2013.01); *H04L 63/1416* (2013.01); *H04L 63/1441* (2013.01); *H04L 63/20* (2013.01)

(58) Field of Classification Search
CPC . H04L 63/20; H04L 63/0236; H04L 63/1416; H04L 63/1441; H04L 63/0218; H04L 63/0263; H04L 45/72; H04L 45/74
See application file for complete search history.

(56) References Cited

U.S. PATENT DOCUMENTS

| | | | |
|---|---|---|---|
| 10,205,701 B1* | 2/2019 | Voss | H04L 61/3025 |
| 10,656,987 B1* | 5/2020 | Nair | G06F 11/0769 |
| 2015/0195198 A1* | 7/2015 | Shin | H04L 12/4625 370/392 |
| 2016/0359886 A1* | 12/2016 | Yadav | H04L 63/1425 |
| 2016/0359887 A1* | 12/2016 | Yadav | H04L 61/1511 |
| 2018/0041374 A1* | 2/2018 | Hasek, IV | H04L 63/0281 |

* cited by examiner

*Primary Examiner* — Beemnet W Dada
(74) *Attorney, Agent, or Firm* — Pillsbury Winthrop Shaw Pittman LLP

(57) ABSTRACT

The present teaching generally relates to providing optimized access control rules. A request may be received from a client device. A determination may be made, based on the request, that an update is needed for access control rule information for the client device. Rule data may be generated. The rule data may include a plurality of data buckets each including one or more access control rules, each data bucket of the plurality being associated with a range of destination port numbers, and where each of the one or more access control rules comprise a set of tuples having a common source network and source port number, and one or more destination port numbers associated with the common source network and source port number. The rule data may be sent to the client device.

20 Claims, 25 Drawing Sheets

METHOD AND SYSTEM FOR INTRUSION DETECTION AND PREVENTION

BACKGROUND

1. Technical Field

The present teaching generally relates to intrusion detection and prevention. More specifically, the present teaching relates to a large-scale distributed firewall.

2. Technical Background

Enforcement of network separation and providing access control rules to client devices (e.g., hosts) may be performed using a perimeter firewall. However, as the number of client devices increases, the perimeter firewall may become overloaded, thereby increasing susceptibility to cyber-attacks. Additionally, the number of access control rules that can be disseminated to the client devices is limited by specific client devices' settings. Standard client devices (e.g., routers, switches) can only implement a finite amount of access control rules. As the number of access control rules increases, the stability of the client devices decreases.

Thus, there is a need for methods and systems that provide efficient and effective dissemination of access control rules to client devices while also monitoring and preventing intrusion to a network. The present teaching aims to address these issues.

SUMMARY

The teachings disclosed herein relate to methods, systems, and programming for providing optimized access control rules. More particularly, the present teaching relates to methods, systems, and programming related to determining one or more access control rules to provide to a client device for provisioning the client device within a networked environment.

In one example, a method, implemented on a machine having at least one processor, memory, and communications circuitry capable of connecting to a network for providing optimized access control rules is described. The method may include receiving a request from a client device; determining, based on the request, that an update is needed for access control rule information for the client device; generating rule data comprising a plurality of data buckets each comprising one or more access control rules, each data bucket of the plurality being associated with a range of destination port numbers, and wherein each of the one or more access control rules comprise a set of tuples having a common source network and source port number, and one or more destination port numbers associated with the common source network and source port number; and sending the rule data to the client device.

In a different example, a system having at least one processor, memory, and communications circuitry capable of connecting to a network for providing optimized access control rules is described. The system may include a request receiver, an update availability determiner, a rule generation system, and a transmission unit. The request receiver may be configured to receive a request from a client device. The update availability determiner may be configured to determine, based on the request, that an update is needed for access control rule information for the client device. The rule generation system may be configured to generate rule data including a plurality of data buckets each comprising one or more access control rules, each data bucket of the plurality being associated with a range of destination port numbers, and wherein each of the one or more access control rules comprise a set of tuples having a common source network and source port number, and one or more destination port numbers associated with the common source network and source port number. The transmission unit may be configured to send rule data to the client device.

Other concepts relate to software for implementing the present teaching on providing optimized access control rules. A software product, in accord with this concept, includes at least one machine-readable non-transitory medium and information and/or instructions stored thereon. The instructions stored on the medium may include executable program code data, parameters in association with the executable program code, and/or information related to a user, a request, content, or information related to providing optimized access control rules, etc.

In one example, a machine-readable, non-transitory and tangible medium having instructions recorded thereon for providing optimized access control rules is described. The instructions, when executed by at least one processor of a computing device, may cause the computing device to receive a request from a client device; determine, based on the request, that an update is needed for access control rule information for the client device; generate rule data comprising a plurality of data buckets each comprising one or more access control rules, each data bucket of the plurality being associated with a range of destination port numbers, and wherein each of the one or more access control rules comprise a set of tuples having a common source network and source port number, and one or more destination port numbers associated with the common source network and source port number; and send the rule data to the client device.

Additional novel features will be set forth in part in the description that follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
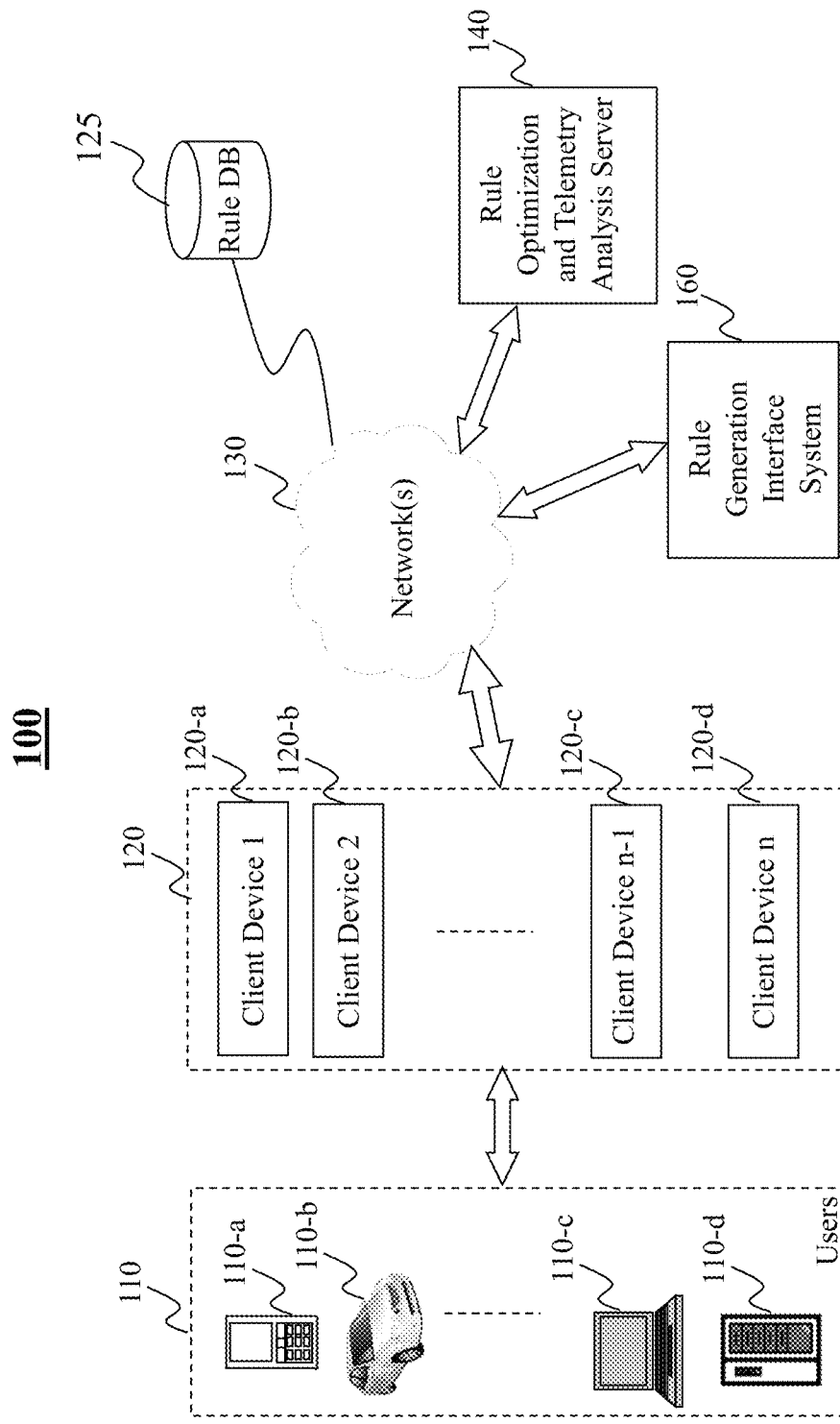
FIGS. 1A and 1B are illustrative diagrams of exemplary network environment for rule optimization and telemetry data analysis, in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to access control rule optimization and telemetry data analysis realized as a specialized and networked system by utilizing one or more computing devices (e.g., mobile phone, personal computer, etc.), client devices (e.g., routers, switches), and network communications (wired or wireless). The disclosed teaching on access control rule optimization and telemetry data analysis includes, but is not limited to, obtaining one or more access control rules to be distributed to a client device, optimizing the access control rule(s) to be sent to the client device to reduce a number of redundancies, and analyzing telemetry data obtained by the client device.

When a computing device (e.g., desktop, laptop, tablet, mobile device, etc.) is to be added into a network, the computing device, typically, needs to be provisioned in a secure manner. In large scale computing systems, whether multiple computing devices are to be added, the provisioning of the multiple computing devices also would ideally occur in a quick enough manner to allow fast access to individuals communicating across the network via those computing devices. Existing network infrastructure have capacity limitations in how fast access control rules can be delivered to those devices. The speed with which the various computing devices can be added to the network is, therefore, restricted by the capacity limitations and/or the speed of the client devices (e.g., routers, switches). As used herein, the terms "client device," "network gear," and "host" may be used interchangeably.

Adding a new machine to a network is an act that is desirable to occur in a secure and quick manner. Existing network infrastructure has various capacity limitations associated with the speed in which access control rules—which specify which machines can communicate with which other machines—may be delivered. The network gear (e.g., routers, switches) have capacity and speed limitations.

Previously, access control rule implementation and generation occurred on the network. If one device attempted to make a connection to another endpoint, and that connection did not work, the device operator would need to file a request to have that connection permitted. The request would go into a ticket queue, and an administrator would look at the request, edit the access control rules, and on a regular cadence (e.g., daily), the new set of access control rules for a particular router would be pushed to that router. The capacity of the routers was constantly needing remediation due to the number of rules being pushed down, leading to router failure. While removing the granularity of the access control rules is an option (e.g., allow one port for everyone), there are risks in doing this. For example, opening up communications to a large number of machines poses risks to the network of allowing unwanted data flow. This creates a consistent trade off of staying up and running or sacrificing containment.

The techniques described herein provide technical solutions for providing access control rules in real-time. Previously, access control rules would only be able to be obtained after waiting a certain amount of time, such as a few days. Using the techniques described herein, access control rules may be deployed in a few seconds, and as well as being fine grained in design. Furthermore, the techniques describe herein allow for traffic on each machine to be monitored and analyzed so as to detect and act on violations. Additionally, a determination as to whether these violations are occurring in the network may occur based on an aggregation and correlation of telemetry data obtained from the machines in the network. Furthermore, by implementing the ability to deploy access control rules, certain types of intrusion to the network may be reduced and/or eliminated.

"Intrusion," as described herein, corresponds to unauthorized access, or an attempt of unauthorized access, by a machine or proxy that should not be allowed to get in contact with a client device. As an illustrative example, if there are 250,000 machines in the network, performing analysis and figuring what is occurring on each machine is labor intensive and extremely difficult. If one machine is compromised in the network, that machine may begin to scan the network for vulnerabilities in other machines. This process may enacted policy violations for the access control rules. As the telemetry data of each machine is monitored in real-time, the policy violation may be identified quickly, and the machine may be quarantined, thereby preventing that machine from communicating with other machines in the network.

Access control rules is a rule that specifies how an entity may interact with a network. For instance, an access control rule may specify that a certain entity may transmit communications to certain computing devices within the network, while another access control rule may specify that a computing device within the network may be prevented from communicated with an entity outside the network. Generally speaking, access control rules, also referred to herein as "access controls," are permissions associated with an object (e.g., a computing device and/or computing system) that grants or prevents access for/to that object. When a data packet is received at a client device (e.g., a router), the access controls associated with that client determine whether or not the data packet meets any of the conditions specified by the access controls. As an illustrative example, a router may include an access control rule that specifies that incoming data packets from an Internet Protocol ("IP") address of 192.0.2.0/24 are permitted, while any other IP address is denied. Therefore, if an incoming data packet having the IP address 192.0.2.1 were received, this data packet would be permitted to access the network. Conversely, if an incoming data packet having the IP address, 198.51.100.0 were received, then this data packet would be denied access to the network. As another illustrative example, a router may include an access control rule that specifies that incoming data packets from an Internet Protocol ("IP") address of 192.0.2.1 are permitted, while any other IP address is denied. Therefore, if an incoming data packet having the IP address 192.0.2.1 were received, this data packet would be permitted to access the network. Conversely, if an incoming data packet having the IP address, 192.0.2.2 were received, then this data packet would be denied access to the network. As used herein, the terms "access control rules," "access controls," "rules," and "policies," may be used interchangeably.

As used herein, the terms "access control rules," "access controls," "rules," and "policies," may be used interchangeably.

Described herein are techniques for de-centralizing access control distribution. The present disclosure allows for increased granularity and decreased restrictions due to capacity limitations of client devices. Furthermore, the present disclosure allows for access control rules to be moved in real-time to client devices as opposed to typically wait times of a few days. Additionally, a network analysis system is capable of being built that allows for each computing device associated with the network to be monitored to quickly and clearly identify rule violations. Doing so enables increased network security and intrusion prevention. As described below, detection of comprised devices within the network allows for quicker isolation of an intrusion, and decreased likelihood of the violation permeating to other devices of the network.

Figure 1B:
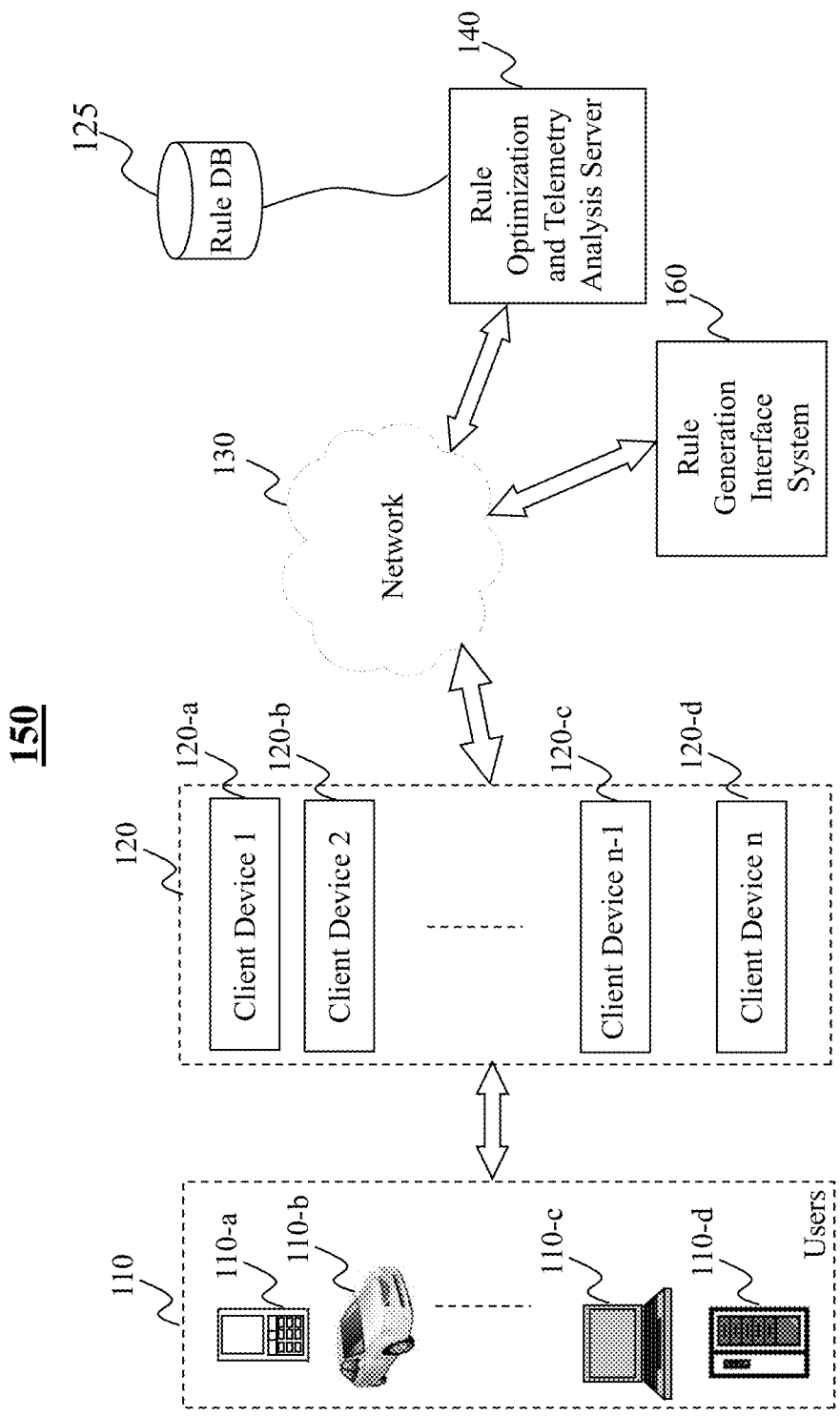

FIGS. 1A and 1B are illustrative diagrams of exemplary network environment for rule optimization and telemetry data analysis, in accordance with various embodiments of the present teaching. In FIG. 1A, an exemplary networked environment 100 is described. Exemplary networked environment 100 includes one or more user devices 110, such as user devices 110-*a*, 110-*b*, 110-*c*, and 110-*d*, one or more client devices 120, such as client devices 120-*a*, 120-*b*, 120-*c*, and 120-*d*, a rule optimization and telemetry analysis server 140, a rule generation interface system 160, and a rule database 125, each of which may communicate with one another via one or more networks 130. Network(s) 130, in some embodiments, may correspond to a single network or a combination of different networks. For example, network(s) 130 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 130 may also include various network access points. For example, environment 100 may include wired or wireless access points such as, and without limitation, base stations or Internet exchange points. Base stations may facilitate, for example, communications to/from user devices 110 and/or client devices 120 with one or more other components of environment 100 across network(s) 130.

User devices 110 may be of different types to facilitate one or more users operating user devices 110 to connect to network(s) 130. User devices 110 may correspond to any suitable type of electronic/computing device including, but not limited to, desktop computers 110-*d*, mobile devices 110-*c* (e.g., mobile phones, smart phones, personal display devices, personal digital assistants ("PDAs"), gaming consoles/devices, wearable devices (e.g., watches, pins/broaches, headphones, etc.), transportation devices 110-*b* (e.g., cars, trucks, motorcycles, boats, ships, trains, airplanes), mobile computers 110-*c* (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user, in one embodiment, may send data (e.g., a request) and/or receive data (e.g., content) via user devices 110.

Client devices 120 may correspond to different types of client devices that allow user devices 110 to communicate across network(s) 130. For example, client devices 120 may correspond to routers, repeaters, switches, and the like. In some embodiments, client devices 120 may be deployed within networked environment 100 such that one or more users 110 may communicate with one another, one or more servers, and/or one or more systems. Furthermore, client devices 120 may allow access to/from one or more content providers, publishers, and the like. Client devices 120, in one embodiment, may receive access control rules, such as an access control list ("ACL"), which may indicate which devices are capable of communicating with other devices within networked environment 100.

Content providers may include one or more content, which may correspond to any suitable content source, such as, and without limitation, an individual, a business, an organization, and the like. For example, a content provider may correspond to a government website, a news site, a social media website, and/or a content feed source (e.g., a blog). In some embodiments, content providers may be vertical content sources. Each content provider may be is configured to generate and send content to one or more of user devices 110 via one or more networks 130, if permitted via access controls for a corresponding client device 120. The content (e.g., a webpage) may include information consumable by a user 110, for instance, as well as one or more advertisements.

Publishers may correspond to one or more publishers that publish content and/or advertisements. For example, a publisher may be configured to present content obtained from a content provider. In some embodiments, a publisher may present one or more advertisements thereon, which may be selected from an advertisement database, an advertisement source, and/or any other suitable entity. In some embodiments, a publisher is configured to provide product(s) and/or service(s), and may be configured to handle the advertising process for its own product(s) and/or a service (e.g., websites, mobile applications, etc.) related to advertising, or a combination thereof. For example, a publishers may include such systems as an advertising agency or a dealer of advertisement that operates a platform that connects an advertiser or advertising agency one or more additional entities.

Rule optimization and telemetry analysis server 140, in the illustrative embodiment, is configured to generate and send rule data to one or more of client devices 120. The rule data may include one or more access control rules that allow/prevent access to one or more computing devices (e.g., user devices 110) of networked system 100. In another embodiment, rules optimization system and telemetry analysis server 140 is configured to analyze telemetry data received from one or more of client devices 120 to assess whether any access control rules have been, or are being, violated. For example, server 140 may assess whether an intrusion is being attempted, and may quarantine a corresponding client device 120 to prevent a violator from gaining access to networked environment 100. While only a single instance of rule optimization and telemetry analysis server 140 is shown within FIGS. 1A and 1B, persons of ordinary skill in the art will recognize that multiple instances of server 140 may exist at the same and/or different geographical locations.

Rule generation interface system 160 may be configured, in some embodiments, to generate one or more access control rules to be implemented by one or more client devices 120. Rule generation interface system 160 may generate rules in response to a request, in response to an addition of a new computing device and/or client device into networked environment 100, and/or any other suitable scenario as known to those skilled in the art. Rule generation interface system 160, upon generation of the one or more access control rules, may provide the rules to rule database 125 for storage. Rule database 125 may be access, in some embodiments, via network(s) 130, however rule database 125 may also be integrated into rule generation interface system 160 (and/or rule optimization and telemetry analysis server 140). Rule database 125 may be configured to store data structures indicating rules to be implemented by a client device 120, one or more source addresses associated with that client device, one or more destination addresses associated with that client device, and/or any other information pertinent to provisioning a device within networked environment 100.

Networked environment 150 of FIG. 1B, in one illustrative embodiment, may be substantially similar to networked environment 100 of FIG. 1A, with the exception that rule database 125 may serve as a backend for rule optimization and telemetry analysis server 140. Alternatively, rule database 125 may serve as a backend for rule generation interface system 160.

Figure 2A:
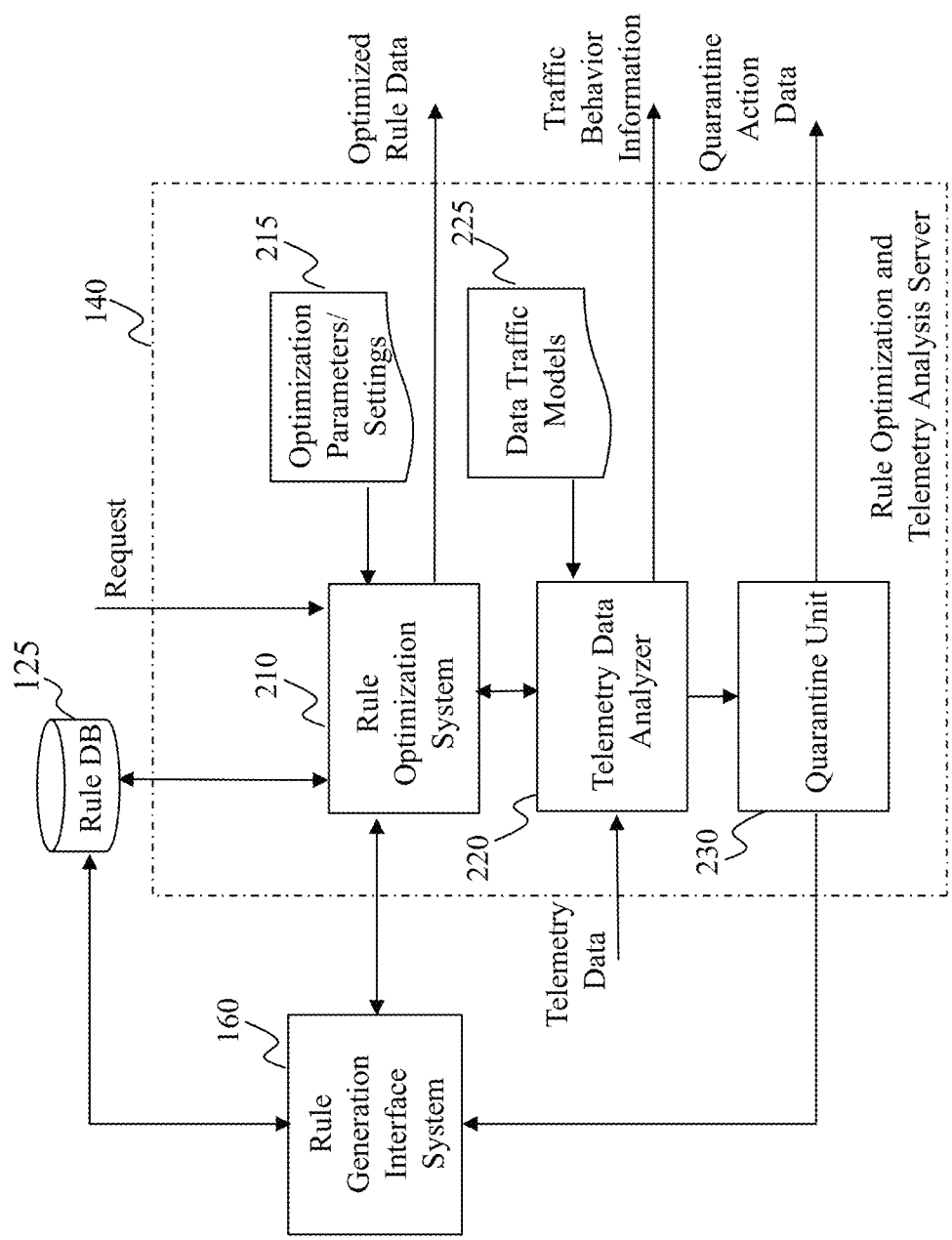
FIG. 2A is an illustrative diagram of an exemplary rule optimization and telemetry analysis server, in accordance with various embodiments of the present teaching.

FIG. 2A is an illustrative diagram of an exemplary rule optimization and telemetry analysis server, in accordance with various embodiments of the present teaching. In the non-limiting embodiment, rule optimization and telemetry analysis server 140 includes a rule optimization system 210, a telemetry data analyzer 220, and a quarantine unit 230. Furthermore, rule optimization and telemetry analysis server 140 may include one or more optimization parameters/settings 215 for assisting rule optimization system 210 in performing rule optimization. Rule optimization and telemetry analysis server 140 may further include one or more data traffic models 225, which may be used by telemetry data analyzer 220 to analyze telemetry data received from one or more client devices 120.

In some embodiments, rule optimization and telemetry analysis server 140 may include one or more processors, memory, and communications circuitry. The one or more processors of server 140 may include any suitable processing circuitry capable of controlling operations and functionality of one or more components/modules of rule optimization and telemetry analysis server 140, as well as facilitating communications between various components within rule optimization and telemetry analysis server 140 and/or with one or more other systems/components of network environments 100, 150. In some embodiments, the processor(s) may include a central processing unit ("CPU"), a graphic processing unit ("GPU"), one or more microprocessors, a digital signal processor, or any other type of processor, or any combination thereof. In some embodiments, the functionality of the processor(s) may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 402 may include its own local memory, which may store program systems, program data, and/or one or more operating systems. However, the processor(s) may run an operating system ("OS") for one or more components of rule optimization and telemetry analysis server 140 and/or one or more firmware applications, media applications, and/or applications resident thereon. In some embodiments, the processor(s) may run a local client script for reading and rendering content received from one or more websites. For example, the processor(s) may run a local JavaScript client for rendering HTML or XHTML content received from a particular URL accessed by user device(s) 110.

The memory may include one or more types of storage mediums such as any volatile or non-volatile memory, or any removable or non-removable memory implemented in any suitable manner to store data for rule optimization and telemetry analysis server 140. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the memory may be implemented as computer-readable storage media ("CRSM"), which may be any available physical media accessible by the processor(s) to execute one or more instructions stored within the memory.

The communications circuitry may include any circuitry allowing or enabling one or more components of rule optimization and telemetry analysis server 140 to communicate with one another, and/or with one or more additional devices, servers, and/or systems. In some embodiments, communications between one or more components of rule optimization and telemetry analysis server 140 may be communicated with user devices 110, client devices 120, etc., via the communications circuitry. For example, network(s) 130 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of rule optimization and telemetry analysis server 140, including, but not limited to, Wi-Fi (e.g., 802.11 protocol), Bluetooth, radio frequency systems (e.g., 1000 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

The communications circuitry may use any communications protocol, such as any of the previously mentioned exemplary communications protocols. In some embodiments, one or more components of rule optimization and telemetry analysis server 140 may include one or more antennas to facilitate wireless communications with a network using various wireless technologies (e.g., Wi-Fi, Bluetooth, radiofrequency, etc.). In yet another embodiment, one or more components of user activity detection system may include one or more universal serial bus ("USB") ports, one or more Ethernet or broadband ports, and/or any other type of hardwire access port so that the communications circuitry facilitates communications with one or more communications networks.

In one embodiment, rule optimization system 210 is configured to obtain one or more access control rules. The access control rules may be received from rule database 125 and/or rule generation interface system 160. For example, rules that have been previously generated may be stored by rule database 125. In this particular scenario, upon receiving a request (e.g., receiving a request from a client device 120), rule optimization system 210 may determine whether the rules and/or a version of the rules associated with client device 120 are the current rules and/or encompass a current version of the rules. If so, then rule optimization and telemetry analysis server 140 may increment the version number of the rules associated with client device 120 to indicate that the version is labeled as being the current version. For example, the rules present on client device 120 may be specified as version "n" (which may correspond to a UNIX timestamp of when the rules were generated), and therefore server 140 may cause the version number to be incremented to "n+1." However, if the rules/rule version on client device 120 is not current, then server 140 may obtain and send updated rule data to client device 120.

Rule generation interface system 160 may generate rules (e.g., access control rules), and may send the rules to rule optimization system 210. Furthermore, in one embodiment, rule generation interface system 160 may send the newly generated rules to rule database 125 for storage. In this particular scenario, the request, along with information associated with the request (e.g., a device ID of the requesting device, an IP address of the requesting device, etc.) may be stored along with the one or more newly generated rules within rule database 125. As described in more detail below, rule optimization system 210 may be configured to generated optimized rule data, and may output that optimized rule data to one or more client devices 120.

Client devices 120 may store a version identifier for the various access control rules that they have implemented thereon. When requesting new/updates access control rules, client devices 120 may share the version identifier with rule optimization and telemetry analysis server 140. Furthermore, rule optimization and telemetry analysis server 140 may store the version identifier associated with each client device 120. Therefore, when a new request is received from the client device, the request indicates the version identifier, and rule optimization and telemetry analysis server 140 determines whether version number has changed.

Client devices 120 are capable of connecting to rule optimization and telemetry analysis server 140 with a request for rules, and rule optimization and telemetry analysis server 140 is configured to send the rules to the client. The rules include, for instance, an IP table set, corresponding a set of IP addresses and description of data buckets for the IP addresses, and an IP table rules, corresponding to the access control rules defined for the IP set. The access control rules enable certain paths to be accepted and certain paths to be denied.

Telemetry data analyzer 220 is configured, in the non-limiting example embodiment, to receive telemetry data from one or more client devices 120. Using data traffic models 225, telemetry data analyzer 220 may determine whether a policy violation and/or intrusion is occurring within networked environment 100. For example, if one of user devices 110 is compromised (e.g., hacked), that user device 110 may begin to scan the other user devices 110 and/or client devices 120 in an attempt to find vulnerabilities in order to compromise those machines. This will cause policy violations to enact as a machine is attempting to talk to another machine with which there are no access control rules present permitting such communications. In some embodiments, in response to determining that a policy violation exists, telemetry data analyzer 220 may send a notification to quarantine unit 230.

Quarantine unit 230 may be configured, in the illustrative embodiment, to generate a quarantine action data comprising a quarantine instruction to one or more user devices 110 and/or client devices 120 with which a policy violation is detected for. The quarantine instruction, for instance, may cause an infected device (e.g., user device(s) 110 and/or client device(s) 120) to be prevented from receiving/transmitting data to any other devices within networked system 100.

Figure 2B:
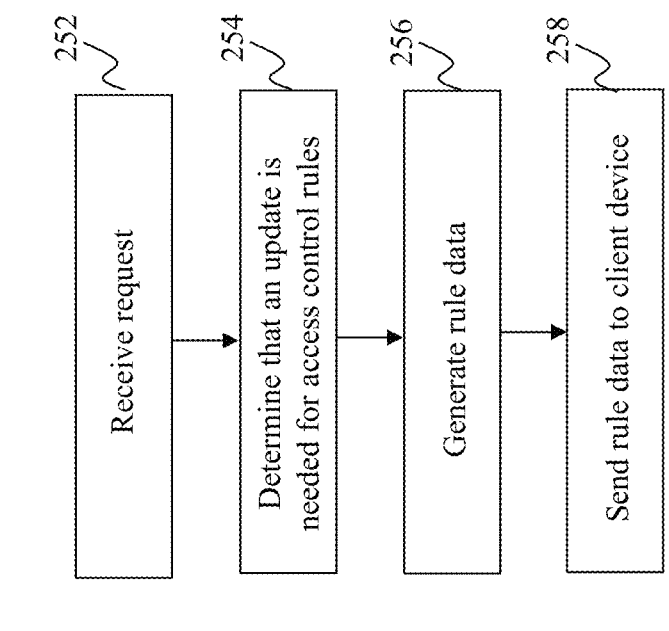
FIG. 2B is an illustrative flowchart of an exemplary process for sending rule data to client devices, in accordance with various embodiments of the present teaching.

FIG. 2B is an illustrative flowchart of an exemplary process for sending rule data to client devices, in accordance with various embodiments of the present teaching. In the illustrative, non-limiting, embodiment, a process 250 may begin at step 252. At step 252, a request may be received. For instance, a request for new rules—if available—may be received by rule optimization and telemetry analysis server 140 from a client device 120.

At step 254, a determination may be made that an update is needed for access control rules stored by a client device. One or more rules that have been newly generated or updated and are applicable for the requesting client device 120 may be identified. If there are no new updates available (e.g., the set of rules that the client device has is current), then no new rule information may be obtained, and the client device may wait until new rules are available. In one embodiment, the updated rule information may be obtained by rule optimization system 210 from rule generation interface system 160 and/or rule database 125.

At step 256, rule data including an IP set and an IP table rules may be obtained. The IP set may include a listing of the IP addresses accessible by the requesting client device (e.g., client device 120), and the IP table rules may include the one or more rules which may govern which of the IP addresses may communicate with one another and/or rule optimization and telemetry analysis server 140. As described in greater detail below, the rule data may be optimized such that a minimum amount of rules are provided to client device 120 to reduce redundancy and ensure maximal protection from intrusion to network environment 100 and/or 150, while also safely provisions all machines communicable with client device 120. At step 258, the rule data may be sent to the requesting client device, or client devices, if two or more client devices have also submitted requests. The optimized rule data, in one embodiment, may be sent from rule optimization and telemetry analysis server 140 to client device(s) 120 across network(s) 130 and/or any other subnetworks.

Figure 3A:
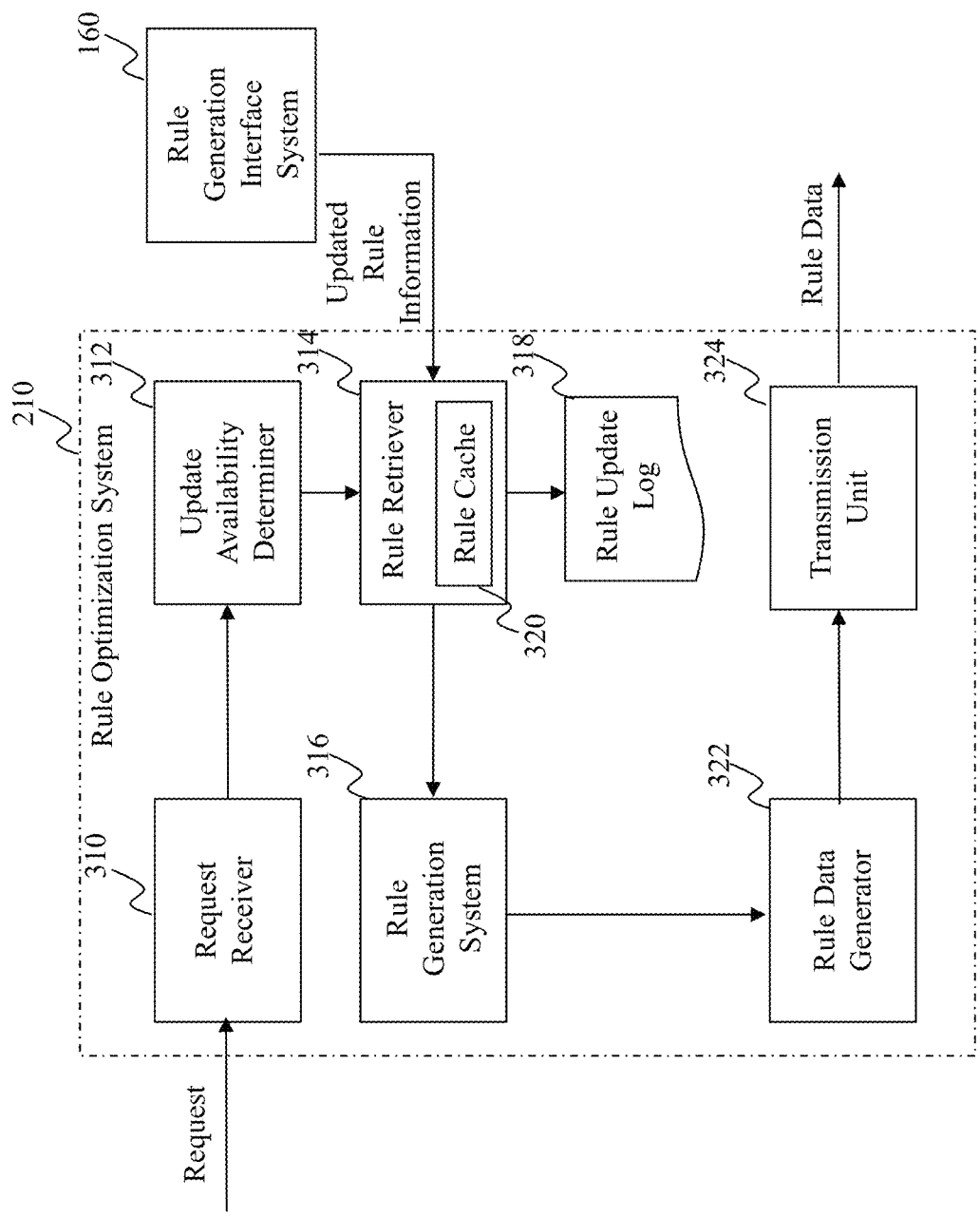
FIG. 3A is an illustrative diagram of an exemplary rule system generator, in accordance with various embodiments of the present teaching.

FIG. 3A is an illustrative diagram of an exemplary rule optimization system, in accordance with various embodiments of the present teaching. Rule optimization system 210, in the illustrative embodiment, includes a request receiver 310, an update availability determiner 312, a rule retriever 314, a rule generation system 316, a rule data generator 322, and a transmission unit 324.

Request receiver 310, in one embodiment, may be configured to receive an incoming request submitted by client device 120 to server 140. For instance, client device 120 may submit a request to rule optimization and telemetry analysis server 140. The request may be for new access control rules and/or an updated version of one or more access control rules. In response to receiving the request, request receiver 310 may identify the particular client device 120 that the request was received from. For example, request receiver 310 may extract an IP address, device identifier, user agent string, and the like. Furthermore, request receiver 310 may be configured to forward the received request, and any information associated with the request (e.g., identification information, request type) to update availability determiner 312.

In some embodiments, request receiver 310 is configured to parse the received request. For instance, upon each instance of client device 120 connected to server 130, a new thread may begin. The thread may include parsing the request to determine an identifier associated with the client device (e.g., an IP address of the client device), as described above, as well as a version number of a current set of access control rules that the client device has. For example, the request may include at least two portions in a plain text file: Address portion; Access control rules version portion. Request receiver 310 may parse the text file to identify the address of the client device and the access control rules version for the client device.

Update availability determiner 312, in one embodiment, may be configured to determine whether there are any new access control rules available and/or if a version of access control rules that the requesting client device has is current. For instance, in one embodiment, update availability determiner 312 identifies the access control rules version from the parsed request and determines whether that version of the access control rules is up to date. If the version of the access control rules is current, then server 140 may implement a WAIT command (e.g., an HTTP long polling), and may respond upon new data becoming available. In another instance, newly generated access control rules may be obtained from rule generation interface system 160. In yet another instance, access control rules may be obtained from rule database 125.

In one embodiment, update availability determiner 312 may determine, based on the request and/or information associated with the requesting client device, which rules may be applicable. For example, the request may include a timestamp indicating a time of that the request was submitted, and the device associated with the request. Update availability determiner 312 may access rule cache 320 in rule retriever 314, and may determine, for that client device, whether any new access control rules have been generated or if a new version of the access control rules for that client device are available. In some embodiments, update availability determiner 312 may be configured to cause new rules and/or updated rules to be fetched from rule generation interface system 160.

In some embodiments, update availability determiner 312 may be configured to identify a radix tree (or other data structure) to see if any relevant changes have been made since the last version of the access control list rules associated with the client device. If new rules have been generated that impact any of the IP addresses associated with the radix tree for that client device, then update availability determiner 312 may generate a notification that new rules are needed for the new radix tree configuration. The new rules may be received, for instance, with the new version number for those rules.

Rule retriever 314 may be configured to retrieve the newly generated and/or updated rules from rule generation interface system 160. The retrieved rules may be stored within rule cache 320. In some embodiments, rule retriever 314 may receive a notification from update availability determiner 312 to determine whether new rules, or a new version of access control rules are available within cache 320 from rule generation interface system 160 (and/or rule database 125) in response to update availability determiner 312 determining that updated access control rules are available. In response, rule retriever 314 may retrieved the updated rules. In some embodiments, rule retriever 314 may log each notification and/or each retrieval from rule generation interface system 160 and/or rule database 125 within rule update log 318. This may allow a system administrator to analyze the retrieval patterns of each client device 120 to identify abnormal rule retrieval requests and/or monitor client device health.

Rule generation system 316 may be configured to reduce a number of access control rules retrieved from rule retriever 314 that will be provided to a particular client device 120. For instance, and as described in greater detail below, a three stage optimization process may be employed to reduce a number of rules applicable to the client device, thereby reducing the number of rules that need to be analyzed for each incoming data packet. In some embodiments, rule generation system 316 may determine a list of IP addresses are associated with a particular client device. Based on the list of IP addresses for that client device 120, retrieved rule reduction unit 316 may determine which groups of access control rules are applicable for that client device 120 and its corresponding list of IP addresses. For those groups, retrieved rule reduction unit may determine which access control rules are covered by those groups in order to reduce the number of rules capable of being provided to the client device down. Retrieved rule reduction unit 316 may then be configured to determine a list of destination port numbers associated with the client device. The remaining access control rules that are applicable to that client device may be determined, the destination port number associated with those rules may be identified. These access control rules may then be grouped together by the destination port number such that rules directed to a same destination port number are placed in a same group. For each destination port number, a pool of source port numbers are identified that are applicable. A determination may then be made as to whether that destination port number has a same list of source port numbers as any other destination port number. If so, retrieved rule reduction unit 316 may convert those rules with a single port each into one rule with a corresponding number of ports.

The number of access control rules remaining may be segmented into one or more data buckets based on a rule reduction parameter. For example, the rule reduction parameter may be a square root parameter. In this particular scenario, if there are 100 different ports, or 100 different source/designation combinations, then the access control rules may be split into 10 packets each including 10 rules. The reasoning for this is that, even though the number of access control rules has been reduced, the list may still be long such that going through each list one by one is time consuming. Therefore, by segmenting the rules into data buckets, the cost of analyzing network packets is optimized such that processing capabilities of server 140 are reduced and latency of network traffic are also reduced. This way, when an incoming data packet is received, a data bucket may be selected based on a corresponding destination port number of the data packet such that the rules associated with that data bucket are analyzed, as opposed to analyzing all of the possible rules available.

Rule data generator 322 may be configured to receive the data buckets and the rules associated with those data buckets and may generate rule data representing those data buckets and rules. For example, the rule data may include the access control rules and the IP addresses associated with those rules. For instance, rule data generator 322 may generate the IP table set for that requesting client device. Rule data generator 322 may then generate the optimized rule data and provide the optimized rule data to transmission unit 324. Transmission unit 324 may then, in the illustrative embodiment, be configured to output the optimized rule data to the particular client device 120 that requested rules.

Figure 3B:
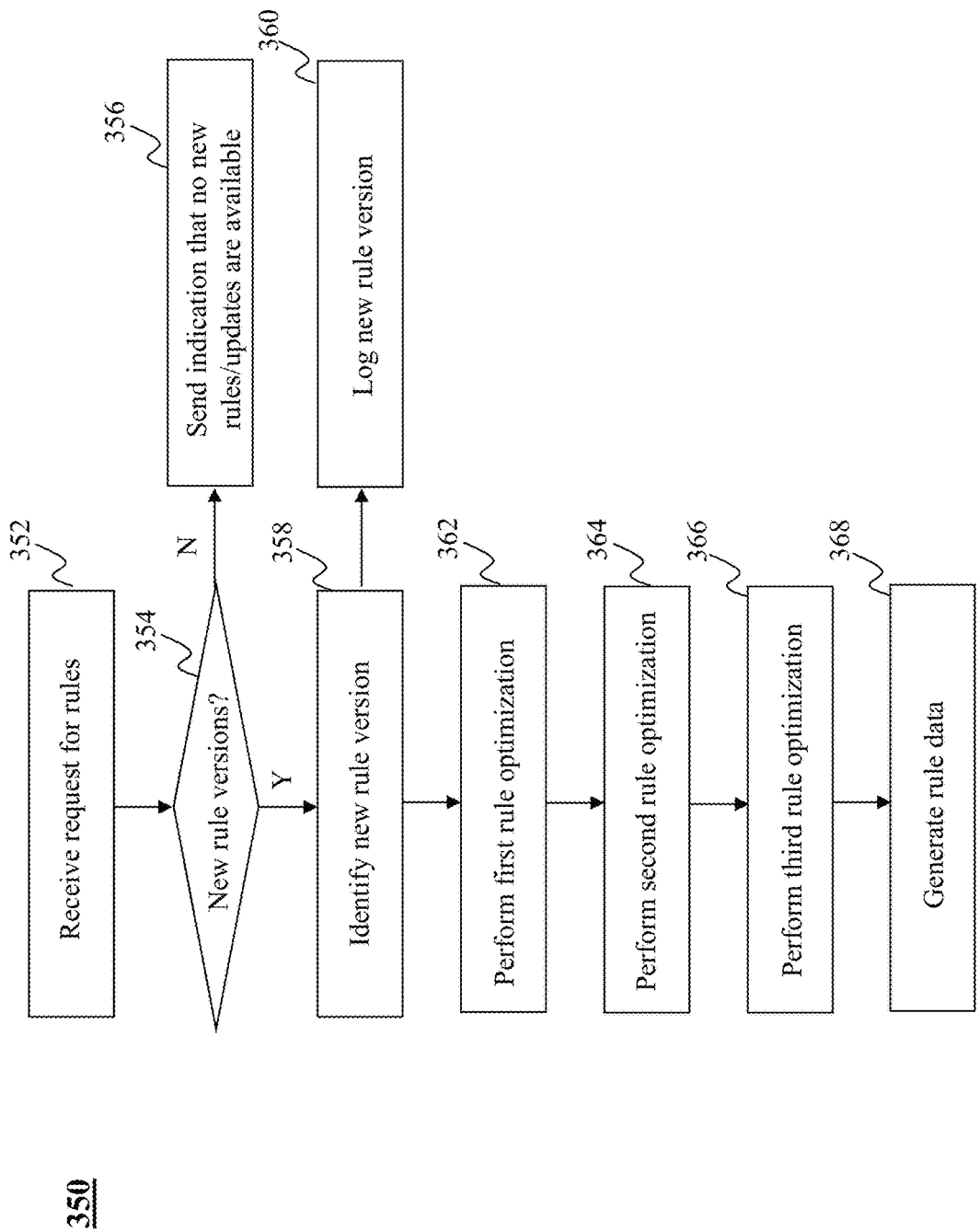
FIG. 3B is an illustrative flowchart of an exemplary process for sending rule data to a client device, in accordance with various embodiments of the present teaching.

FIG. 3B is an illustrative flowchart of an exemplary process for sending rule data to a client device, in accordance with various embodiments of the present teaching. In a non-limiting embodiment, process 350 may begin at step 352. At step 352, a request for access control rules may be received. For instance, request receiver 310 may receive a request for new rules submitted by a client device 120 to server 140. At step 354, a determination may be made as to whether there are any new rules/new versions of rules/ updates to existing rules available. For example, update availability determiner 312 may determine whether there is a new version of the access control rules for a particular client device based on the version identified within the request. If, at step 354, it is determined that there are no new rules/versions of rules/updates to rules available, then process 350 may proceed to step 356. At step 356, an indication may be sent to the client device 120 that there are no new rules/updates available. In some embodiments, the rule version may be incremented. In some embodiments, rule optimization system 210 may, alternatively or additionally, cause the requesting client device 120 to stand idle (e.g., HTTP long polling) until there are new rules/updates/versions available.

If, at step 354, it is determined that there are new rules/updates/versions available, then process 350 may proceed to step 358. At step 358, the updated rules and/or new rules may be retrieved. For example, the new rules/updated rules may be identified within rule cache 320 by rule retriever 314. At step 360, the new rule version may be logged in rule update log 318. Step 360, in some embodiments, may be optional.

At step 362, a first rule optimization may be performed. For instance, the source IP addresses having a same communications protocol, source port number range, destination IP address, destination port number, and options (if any) may be identified. For example, rule generation system 320 may reduce the number of rules retrieved by rule retriever 314. At step 364, a second rule optimization may be performed. The second rule optimization may correspond to merging multiple port numbers/port number ranges into a single rule. For example, two rules having a same port number may be merged into one rule have two ports. At step 366, a third rule optimization may be performed. For instance, the rules may be organized into data buckets each being associated with a particular port range (e.g., Bucket_A::0: N, Bucket_B::N: N+1, etc.). At step 368, the rule data may be generated. The rule data, for example, may include each data bucket and the corresponding rules and port ranges associated with those data buckets.

At step 366, rule data may be generated. The rule data, for instance, may include the IP set and the IP table rules to be provided to a requesting client device 120. In some embodiments, rule data generator 322 may generate the rule data. At step 358, the rule data may be sent to the client device. For instance, transmission unit 324 may output the optimized rule data to requesting client device 120.

Figure 4A:
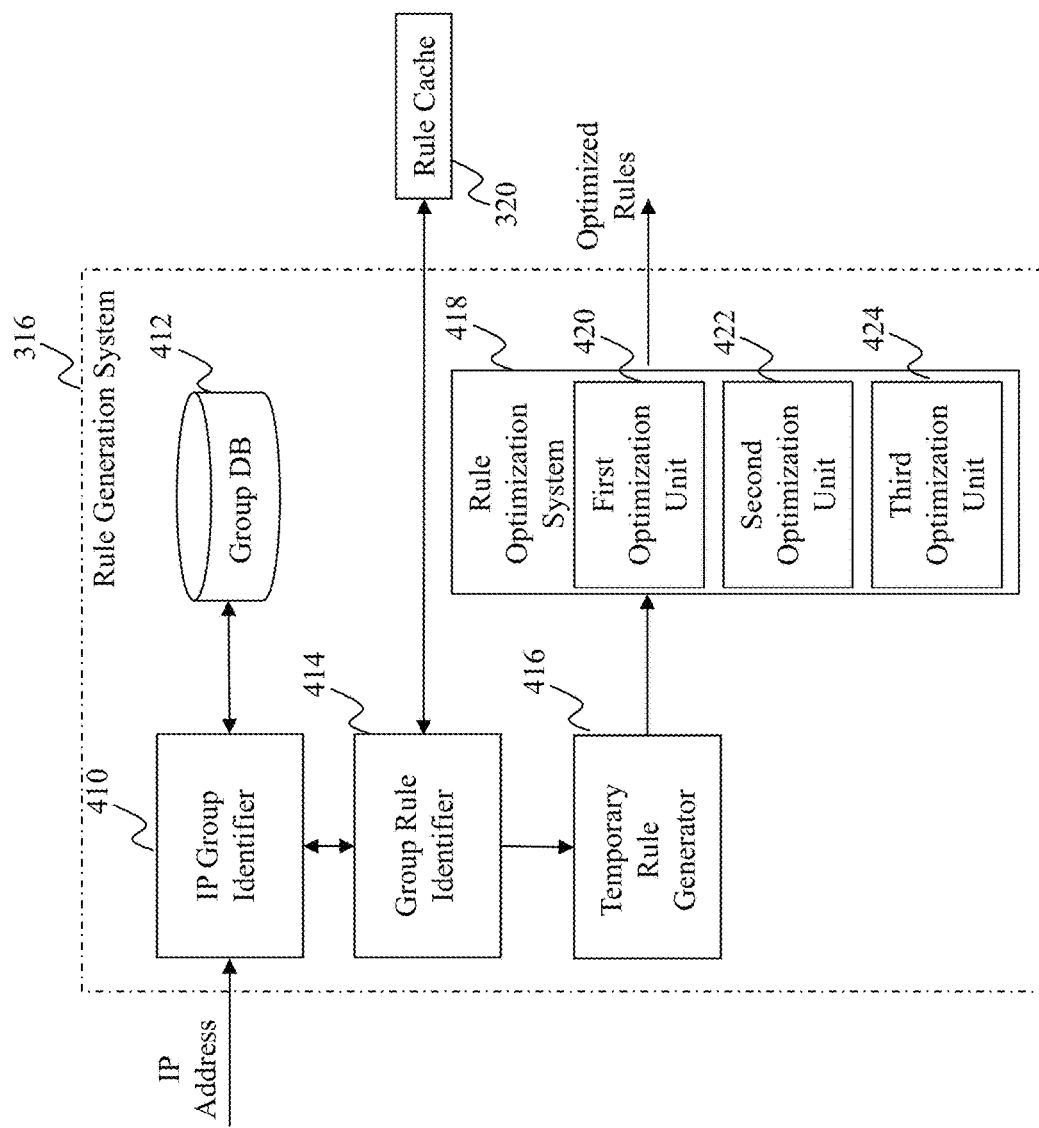
FIG. 4A is an illustrative representation of an exemplary rule generation system, in accordance with various embodiments of the present teaching.

FIG. 4A is an illustrative representation of an exemplary rule generation system, in accordance with various embodiments of the present teaching. In the non-limiting illustrative embodiment, rule generation system 316 includes an IP group identifier 410, a group database 412 a group rule identifier 414, a temporary rule generator 416, and a rule optimization system 418. In some embodiments, rule generation system 316 may implement one or more computer programs using one or more processors to perform the functions associated with IP group identifier 410, group rule identifier 414, temporary rule generator 416, and rule optimization system 418.

IP group identifier 410, in one embodiment, is configured to receive an IP address associated with a client device (e.g., client device 120) that the request was received from. After obtaining the IP address, IP group identifier 410 may access group database 412, which may include a number of groups and the subnets (e.g., IP addresses) associated with those groups. IP group identifier 410 may determine which group or groups, if more than one, the received IP address is associated with. As an illustrative example, group database 412 may include three groups: Group A, Group B, and Group C. Group A may include IP addresses: IP_1, IP_2, and IP_3; Group B may include IP addresses: IP_1 and IP_4, and Group C may include IP addresses: IP_2, IP_5, and IP_6. Therefore, if the received IP address corresponds to IP_1, then IP group identifier 410 may determine that the received IP address belongs to groups Group A and Group B.

Group rule identifier 410 may be configured to determine which access control rules are applicable to the groups identified by IP group identifier 410. For example, one access control rule may apply to Groups A and C. Therefore, group rule identifier 410 may identify this rule as being an applicable rule. As another example, another rule may only apply to Group C. Group rule identifier 414 may, in this scenario, determine that this other rule is not applicable. The access control rules that are identified as being applicable to the identified groups may then be provided to temporary rule generator 416.

Temporary rule generator 416 may be configured, in one embodiment, to generate a temporary set of rules. For instance, the temporary set of rules may be temporary access control rules that are for the access control rules identified by group rule identifier 414 corresponding to the groups identified by IP group identifier 410. In some embodiments, each rule of the temporary set of rules may have a format:
PERMIT\
$protocol\
$sourceNetwork\
$sourcePortRange\
$destinationIP\
$destinationPortRange\
$options.

In the illustrative embodiment, the aforementioned rule may be a permit rule (e.g., allow access). The protocol may correspond to the communications protocol to be employed by this rule. For example, protocol may be a TCP communications protocol. The source network may correspond to the group with which the received IP address corresponds to. If the IP address corresponds to more than one group, then a separate instance of this rule may be created as well. The source port range may correspond to a port range that the group is associated with. The destination IP address may correspond to the IP address provided by the client as identified from the request. The destination port range may correspond to a range of ports that the destination IP address is associated with. The options may correspond to additional features associated with the request (e.g., established in associated with the protocol). The temporary set of rules may, in turn, be provided to rule optimization system 418, which may generate and output optimized access control rules. In one embodiment, rule optimization system 418 may include a first optimization unit 420 that performs a first optimization thread, a second optimization unit 422 that performs a second optimization thread, and a third optimization unit 424 that performs a third optimization thread.

Figure 4B:
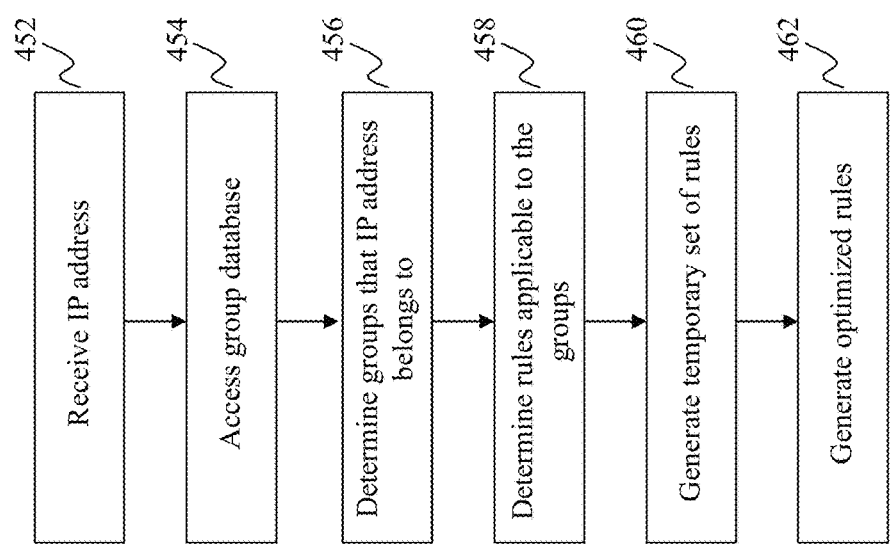
FIG. 4B is an illustrative flowchart of an exemplary process for generating optimized rules, in accordance with various embodiments of the present teaching.

FIG. 4B is an illustrative flowchart of an exemplary process for generating optimized rules, in accordance with various embodiments of the present teaching. Process 450, in a non-limiting embodiment, may begin at step 452. At step 452, an IP address may be received. In one embodiment, the IP address may be received by IP group identifier 410 from the received request. At step 454, a group database may be accessed. For instance, IP group identifier 410 may access group database 412, including a plurality of groups and their corresponding subnets. At step 456, each group that the received IP address belongs to may be determined. At step 458, rules applicable to the groups may be determined. For instance, rules (e.g., rules cached in rule cache 320) that applicable to each of the identified groups from step 456, may be determined. In one embodiment, group rule identifier 414 may determine the rules applicable to the identified groups. At step 460, a temporary set of rules may be generated. For example, temporary rule generator 416 may create a temporary set of rules based on the rules identified at step 458 and the groups identified at step 456. At step 462, optimized rules may be generated. For example, optimized rules may be generated by rule optimization system 418.

Figure 5A:
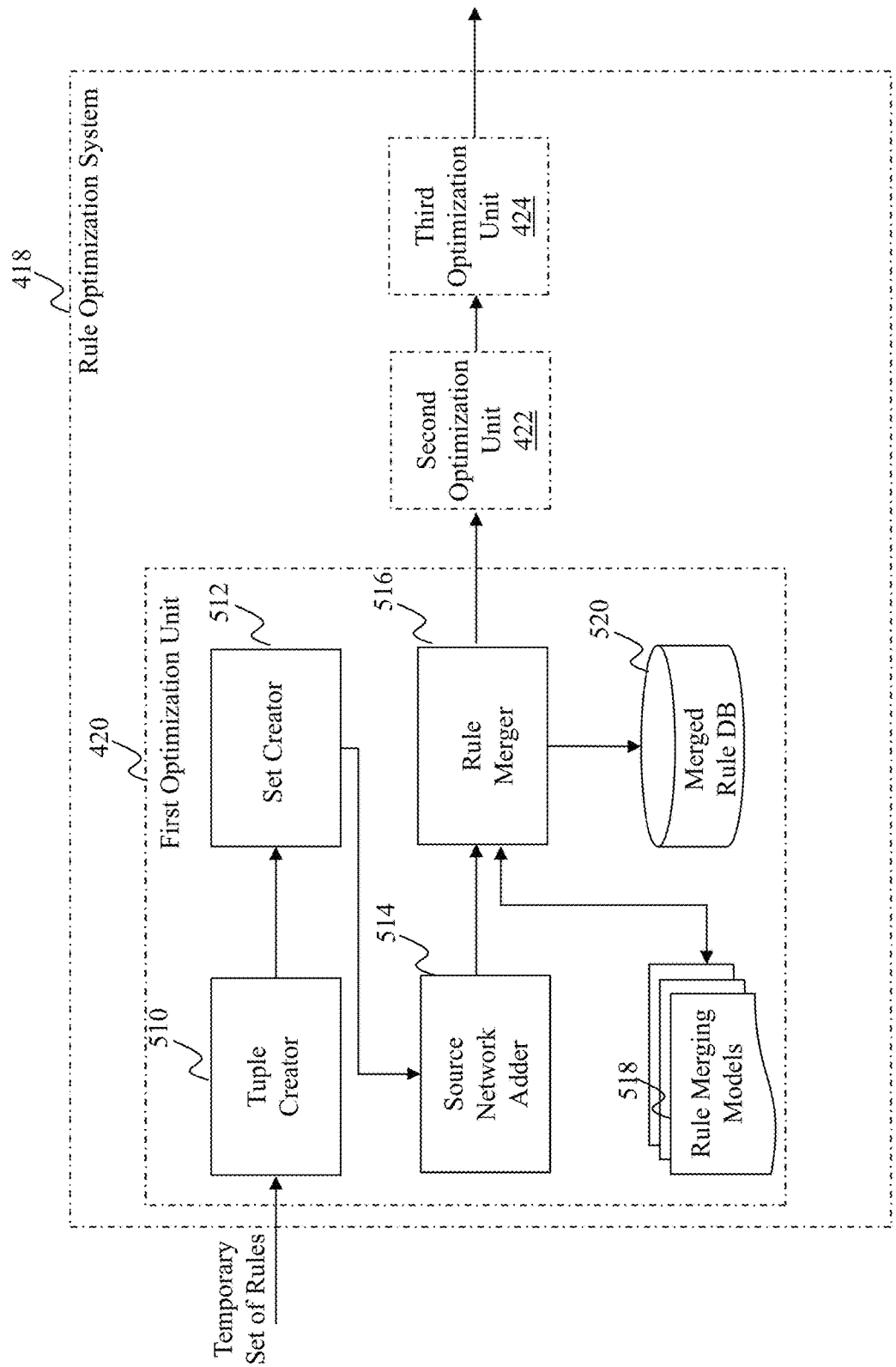
FIG. 5A is an illustrative diagram of an exemplary first optimization unit, in accordance with various embodiments of the present teaching.

FIG. 5A is an illustrative diagram of an exemplary first optimization unit, in accordance with various embodiments of the present teaching. First optimization unit 420 may include, in the illustrative embodiment, a tuple creator 510, a set creator 512, a source network added 514, a rule merger 516, one or more rule merging models 518, and a merged rule database 520. In some embodiments, first optimization unit 420 may implement one or more computer programs using one or more processors to perform the functions associated with tuple creator 510, set creator 512, source network added 514, and rule merger 516.

Tuple creator 510 may be configured, in one embodiment, to obtain the temporary set of rules generated by temporary rule generator 416. Upon obtaining the temporary set of rules, tuple creator 510 may generate a list of unique tuples (e.g., different tuples) having a first set of properties. In one embodiment, the first set of properties may specify that each tuple may include a rule identified by the protocol, destination IP address, destination port number range, and options associated with that rule from the temporary set of rules. For example, the tuples may have the format $protocol, $destinationIP, $destinationPortRange, $options. An exemplary list of rules may be seen below with reference to Table 1.

TABLE 1

| Rule # | Representation |
| --- | --- |
| 1 | PERMIT tcp 10.1.0.0/24 1024-65535 192.02.1 80 |
| 2 | PERMIT tcp 10.2.0.0/24 1024-65535 192.02.1 80 |
| 3 | PERMIT tcp 10.3.0.0/24 1024-65535 192.02.1 80 |
| 4 | PERMIT tcp 10.1.0.0/24 1024-65535 192.02.1 443 |
| 5 | PERMIT tcp 10.2.0.0/24 1024-65535 192.02.1 443 |
| 6 | PERMIT tcp 10.3.0.0/24 1024-65535 192.02.1 443 |

As seen from Table 1, each rule of the exemplary list is associated with a permit rule for a tcp communication protocol. The source network and source port range may follow next (e.g., 10.1.0.0/24 1024-65535, 10.2.0.0/24 1024-65535, and 10.3.0.0/24 1024-65535), after which is the destination IP address (e.g., 192.02.1) and the destination port range (e.g., 80 or 443). Within each rule is a tuple, composed of the protocol, destination IP address, destination port range, and options (if any).

Set creator 512 may be configured to create one or more sets (e.g., set of tuples). For each unique tuple (e.g., non-repeating), a set of tuples may be created by tuple creator 510. For example, each of rules 1-6 are unique, in the illustrative example. However, there may be some overlapping tuples. In the illustrative embodiment, each of rules 1-3 and 4-6 may have a same tuple. For example, of rules 1-6, there may exist a first tuple: {tcp, 192.0.2.1, 80} and a second tuple: {tcp, 192.0.2.1, 443}. Therefore, two sets, SET 1 and SET 2, may be created by set creator 512.

Source network adder 514 may be configured to take each SET (e.g., SET 1 and SET 2), and add the source network for each rule to that set. For example, the source networks 10.1.0.0, 10.2.0.0, and 10.3.0.0 may be added to each set as the tuples of SET 1 and SET 2 include each of these source network.

Rule merger 516 may be configured to merge the rules with the same unique tuple into the appropriate set. In one embodiment, rule merger 516 may employ one or more rule merging models 518 to determine how the rules are to be merged together. For example, one rule merging model may indicate that all rules with the same unique tuple are to be merged together referencing the combined set. Therefore, the multiple rules as indicated from Table 1 may be reduced down to two rules, as detailed by Table 2. In some embodiments, the reduced rules may be stored within merged rule database 520. In response, first optimization unit 420 may provide the reduced rules (e.g., Table 2) to second optimization unit 422.

TABLE 2

| Rule # | Reduced Rule |
| --- | --- |
| 1 | PERMIT tcp SET1 1024-65535 192.0.2.1 80 |
| 2 | PERMIT tcp SET2 1024-65535 192.0.2.1 443 |

Figure 5B:
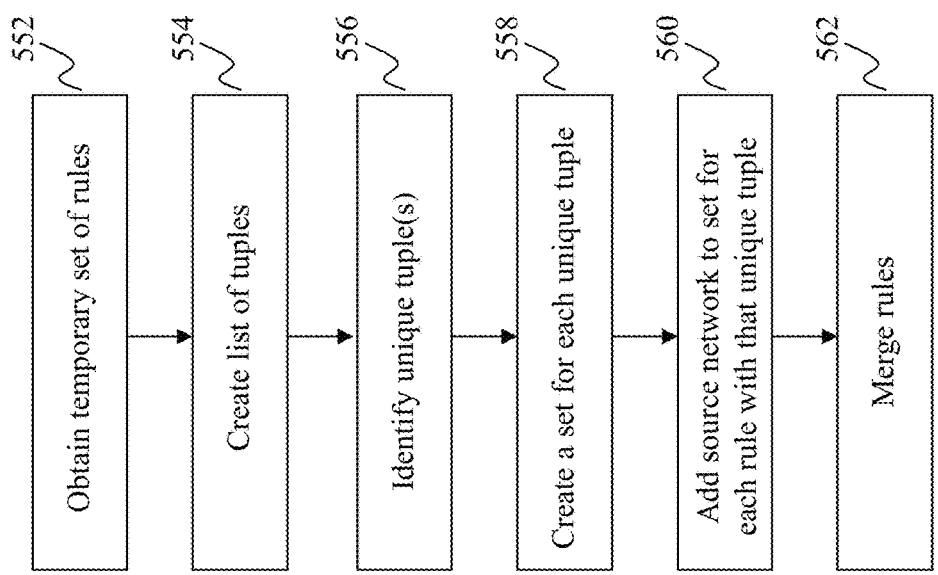
FIG. 5B is an illustrative flowchart of an exemplary process for performing a first rule optimization, in accordance with various embodiments of the present teaching.

FIG. 5B is an illustrative flowchart of an exemplary process for performing a first rule optimization, in accordance with various embodiments of the present teaching. Process 550 may, in a non-limiting embodiment, begin at step 552. At step 552, a temporary set of rules may be obtained. For instance, first optimization unit 420, and in particular tuple creator 510, may receive a temporary set of rules generated by temporary rule generator 416. At step 554, a list of tuples may be created. For example, tuple creator 510 may create a list of tuples. In one embodiment, each tuple will have a unique combination of communication protocol, destination IP address, destination port range, and options, if any. At step 556, any unique tuples within the list may be identified. For example, within Table 1, there may be two unique tuples. At step 558, a set of each unique tuple may be created. For instance, set creator 512 may be configured to create the set of each unique tuple. At step 560, a source network may be added to each set for each rule with a corresponding. For instance, source network added 514 may add the source network for each rule to the corresponding unique tuple. At step 562, the rules may be merged. For instance, rule merger 516 may merge all of the rules with the same unique tuple into the corresponding set (e.g., one of SET 1 or SET 2). The result may be Rules 1 and 2 of Table 2.

Figure 6A:
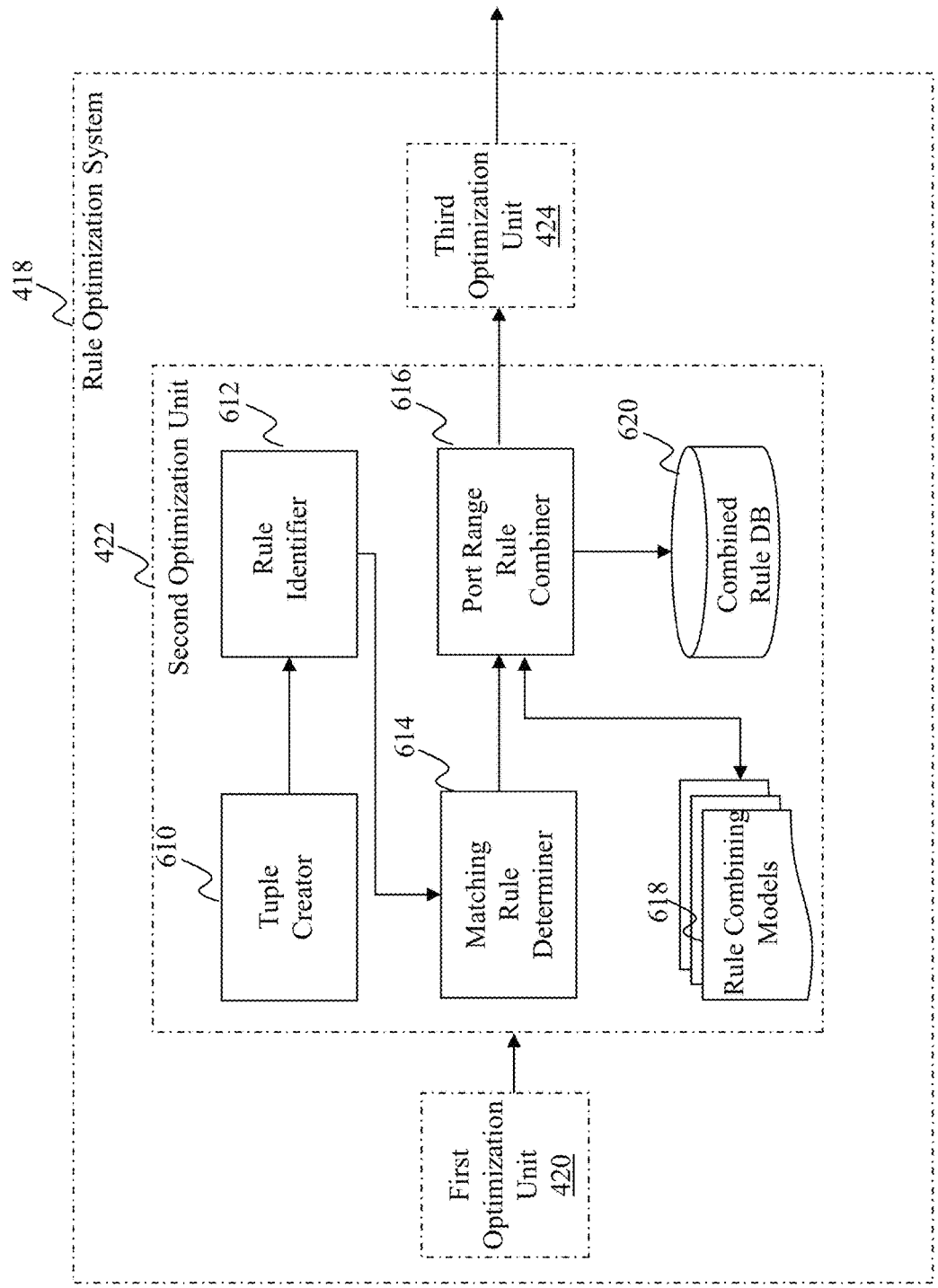
FIG. 6A is an illustrative diagram of an exemplary second optimization unit, in accordance with various embodiments of the present teaching.

FIG. 6A is an illustrative diagram of an exemplary second optimization unit, in accordance with various embodiments of the present teaching. Second optimization unit, in the illustrative embodiment, may include a tuple creator 610, a rule identifier 612, a matching rule determiner 614, a port range rule combiner 616, one or more rule combining models 618, and a combined rule database 620. In some embodiments, second optimization unit 422 may implement one or more computer programs using one or more processors to perform the functions associated with tuple creator 610, rule identifier 612, matching rule determiner 614, and port range rule combiner 616.

Tuple creator 610, in one embodiment, may be configured to generate a set of tuples having a second set of properties. In one embodiment, the second set of properties may specify that each tuple is to include a protocol, a set with which that rule is associated, a destination IP address associated with that rule, and any options that are associated with that rule. For example, the tuples created by tuple creator 610 may have a format [$protocol, $SET, $destinationIP, $options]. Tuple creator 610, in one embodiment, may further be configured to receive the merged rules from first optimization unit 420.

Rule identifier 612 may be configured to determine each and every rule applicable to a particular tuple created by tuple creator 610. As an illustrative example, using the merged rules from first optimization unit 420, a first tuple and a second tuple may be identified having tcp as protocol, destination IP address 192.0.2.1, and one of SET1 or SET2 as the corresponding set (e.g., {tcp, SET1, 192.0.2.1}, {tcp, SET2, 192.0.2.1}). For each of the first and second tuple, rule identifier 612 may determine that rules 1 and 2 from Table 2 apply.

Matching rule determiner 614 may be configured to determine if two or more rules match. For instance, matching rule determiner 614 may determine that SET1 and SET2 include a same set of source networks (e.g., 10.1.0.0, 10.2.0.0, 10.3.0.0). Therefore, because SET1 and SET2 match, the rules associated with these two tuples may be merged using port range rule combiner 616.

Port range rule combiner 616 may be configured to merge matching rules into a single rule. In one embodiment, port range rule combiner 616 may be configured to replace a single port associated with each rule (e.g., rule 1 and rule 2) with a combined port range. In some embodiments, port range rule combiner 616 may employ one or more rule combining models 618 to combine the one or more rules. As an illustrative example, Rule 1 and Rule 2 may be combined into a single rule as both Rule 1 and Rule 2 include a same set of source networks. The combined rule may be represented by:

PERMIT tcp SET1 1024-65535 192.0.2.1 80, 443.

The combined rule, for instance, is a single rule having two ports, port 80 and port 443, associated therewith. In some embodiments, each combined rule may be stored within combined rule database 620.

Figure 6B:
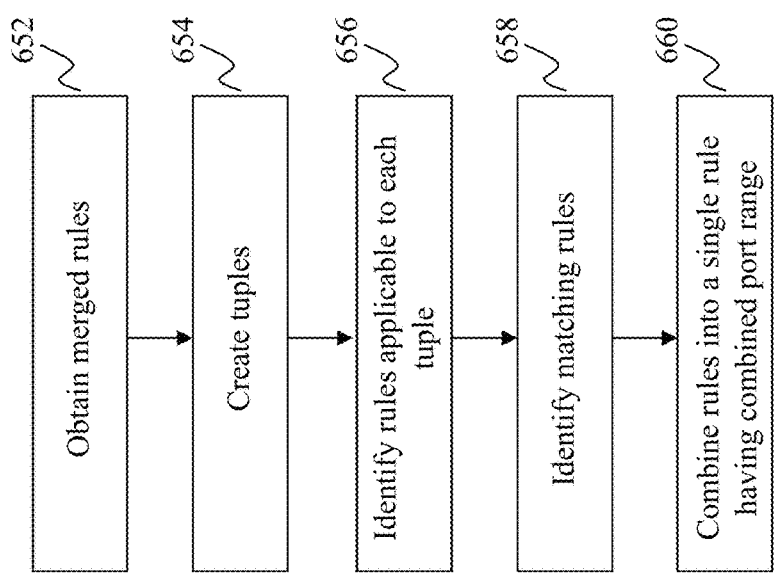
FIG. 6B is an illustrative flowchart of an exemplary process for performing a second rule optimization, in accordance with various embodiments of the present teaching.

FIG. 6B is an illustrative flowchart of an exemplary process for generating a combined rule, in accordance with various embodiments of the present teaching. In a non-limiting embodiment, process 650 may begin at step 652. At step 652, the one or more merged rules may be obtained. For instance, the one or more merged rules may be obtained by second optimization unit 422 from first optimization unit 420. At step 654, one or more unique tuples may be created. For instance, tuple creator 610 may be employed to create unique tuples having a second set of parameters (e.g., protocol, set, destination IP address, and options). At step 656, one or more rules applicable to each tuple may be identified. For instance, rule identifier 612 may determine each rule from the merged rules that are applicable to each of the created tuples at step 654. At step 658, one or more tuples having a matching rule or rules may be identified. For instance, matching rule identifier 614 may determine that a first rule and a second rule each applicable to a first tuple and a second tuple. For example, SET1 and SET2 for Rules 1 and 2 of Table 2 may include a same set of source networks (e.g., 10.1.0.0, 10.2.0.0, 10.3.0.0). At step 660, the rules may be combined into a single rule having a combined port range. For instance, port range rule combiner 616 may combine matching rules into a single rule with a combined port range. Continuing the example set forth by Table 2, Rules 1 and 2 may be combined into a single rule having the combined ports 80 and 443.

Figure 7A:
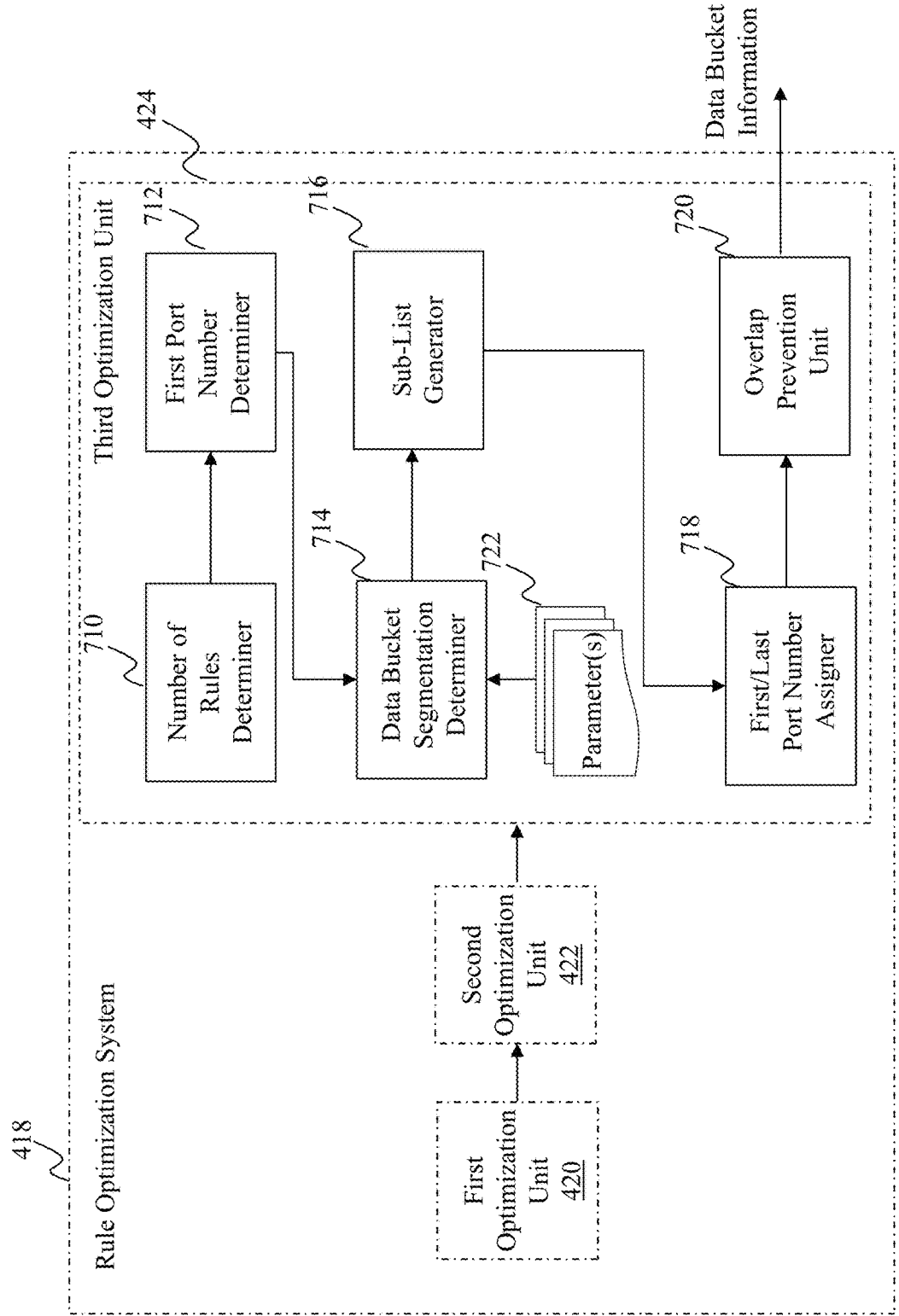
FIG. 7A is an illustrative diagram of an exemplary third optimization unit, in accordance with various embodiments of the present teaching.

FIG. 7A is an illustrative diagram of an exemplary third optimization unit, in accordance with various embodiments of the present teaching. Third optimization unit 424, in the illustrative embodiment, may include a number of rules determiner 710, a first port number determiner 712, a data bucket segmentation determiner 714, a sub-list generator 916, a first/last port number assigner, and an overlap prevention unit 720. In some embodiments, third optimization unit 424 may implement one or more computer programs using one or more processors to perform the functions associated with number of rules determiner 710, first port number determiner 712, data bucket segmentation determiner 714, sub-list generator 716, first/last port number assigner, and overlap prevention unit 720.

Number of rules determiner 710, in one embodiment, may be configured to determine a number of rules that have been generated based on the optimization processes performed by first optimization unit 422 and second optimization unit 424. For instance, second optimization unit 422 may output a plurality of combined rules. These combined rules may be provided to third optimization unit 424, and in particular number of rules determiner 710. The combined rules that are received may be received in a data structure. For example, data representing a list of combined rules may be received. In some embodiments, number of rules determiner 710 may include a counter and/or counting logic, that facilitates the determination of the number of combined rules that have been received.

First port number determiner 712 may be configured to determine a first destination port number for the combined rules that were received. For instance, using the combined rule PERMIT tcp SET1 1024-65535 192.0.2.1 80, 443, the first destination port number may correspond to port "80." Each combined rule from the list may have its corresponding first destination port number identified. In some embodiments, first port number determiner 712 may be configured to sort the list of combined rules into a new list of combined rules based on the first destination port numbers of the combined rules. For example, if two combined rules include, as their first destination port number, the port numbers 22 and 2222, then the combined rule having a first destination port number "22" may be sorted in the list of combined rules prior to the combined rule having a first destination port number "2222."

Data bucket segmentation determiner 714 may be configured to determine a segmentation technique for dividing the combined rules into one or more data buckets. In one embodiment, data bucket segmentation determiner 714 may access parameter(s) 722 for determining the segmentation technique. One example parameter 722 may be a square root function, where the number of data buckets to be generated corresponds to the square root of the number of combined rules, determined by number of rules determiner 710. As an illustrative example, if there are 100 combined rules, then there the number of data buckets will be 10 data buckets. In the aforementioned scenario, if the number of combined rules is not a perfect square, then the number of data buckets may correspond to a rounded whole integer value of the square root number. For instance, if there were 72 combined rules, then $\sqrt{72}$~8.5, which may be rounded such that 9 data buckets are used. Alternatively, the square root number may be rounded down, such that for 72 combined rules, 8 data buckets are used.

Sub-list generator 916 may be configured to generate sub-lists from the list of combined rules. The number of sub-lists may be based on the number of data buckets that will be generated. This number may be determined, as described above, by data bucket segmentation determiner 714. For example, if there are 100 combined rules, then sub-list generator 916 may generate 10 sub-lists, each including 10 combined rules.

First/last port number assigner 718 may be configured to determine a first port number for a first combined rule of a first sub-list. As mentioned previously, the list of combined rules may be sorted by the first destination port number. Therefore, in one embodiment, the first port number for the first combined rule of the first sub-list may correspond to a "lowest" number port (e.g., port 22 is lower than port 80). Similarly, first/last port number assigner 718 may be configured to determine a last port number for a last combined rule of the first sub-list. For example, if there are 10 combined rules in the first sub-list, then the first port number of the $10^{th}$ combined rule may be determined. First/last port number assigner 718 may output a port number set (e.g., "first port":: "last port"). The port number set may then be assigned to one of the data buckets. This may indicate that that particular data bucket includes rules whose port numbers range between the first port number and the last port number. A similar process may be applied to each sub-list. Therefore, each data bucket may have a port number set assigned thereto indicating the port number range of that data bucket.

In some embodiments, first/last port number assigned may further be configured to redistribute the combined rules into different data buckets. Using the determined segmentation parameter (e.g., 10 for 100 rules), the first N combined rules—where N is the number of rules divided by the number of data buckets rounded to the closest integer—may be scanned. For example, the first 10 combined rules may be analyzed. The lowest destination port number within that N combined rules may be identified. Next, any additional combined rules that also include that destination port number may be identified. The port range for that particular data bucket may then be assigned based on the scanned port rules. This may allow for an instance of any combined rule that includes a lower port number to be included in the data bucket associated a range of port numbers including that lower port number. In some embodiments, a copy/duplicate of this combined rule may be generated and retained in the original data bucket. For example, a rule including the ports 22, 2222 may be included within a data bucket including the port ranges 22: 443, and another instance of that rule may also be included in a different data bucket including the ranges 2222: 6635.

Overlap prevention unit 720 may be configured to make sure that there is not overlap between data bucks. If a last port number of a first data bucket is equal to a first port number of a subsequent data bucket, the overlap prevention unit 720 may cause the first port number of the subsequent data bucket to be incremented. Additionally or alternatively, the last port number of the first data bucket may also be incremented and/or decremented.

Figure 7B:
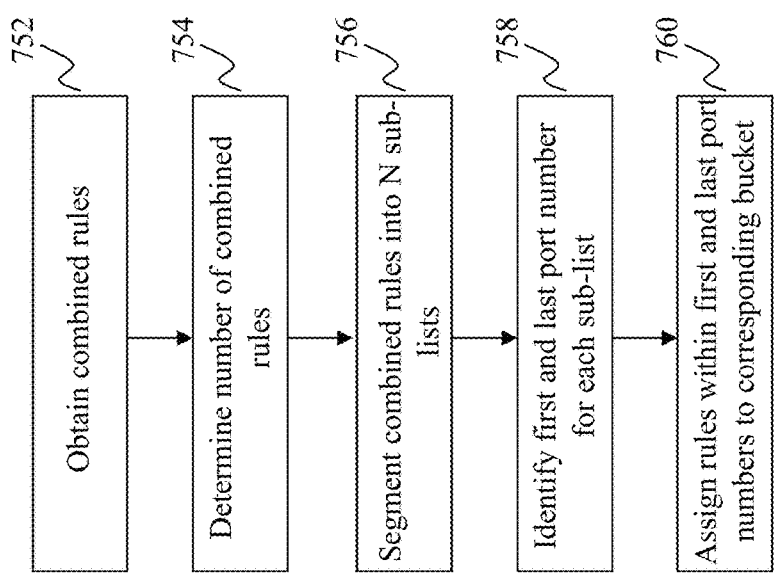
FIG. 7B is an illustrative flowchart of an exemplary process for performing a third rule optimization, in accordance with various embodiments, of the present teaching.

FIG. 7B is an illustrative flowchart of an exemplary process for performing a third rule optimization, in accordance with various embodiments, of the present teaching. In a non-limiting embodiment, process 750 may begin at step 752. At step 752, combined rules may be obtained. For instance, combined rules (e.g., a list of combined rules) output by second optimization unit 422 may be received by third optimization unit 424. At step 754, a number of combined rules may be determined. For instance, number of combined rules determiner 710 may determine a number of combined rules included within the received list of combined rules. At step 756, the combined rules may be segmented into N sub-lists. The number N may be determined by data bucket segmentation determiner 714 based on one or more parameters 722. Sub-list generator 716 may then generate N sub-lists each including N combined rules. At step 758, a first port number and a last port number of each sub-list may be identified. For instance, first/last port number assigner 718 may determine a first port number of a first combined rule within a first sub-list as well as a last port number of a last combined rule of the first sub-list. Furthermore, rules within the port range specified by the first port number and the last port number maybe assigned to a corresponding data bucket. In some embodiments, the data buckets may further be assigned port ranges based on a lowest port number within the combined rules of that data bucket. Still further, combined rules may overlap across two or more data buckets if a rule within those data buckets share a common port.

Figure 8A:
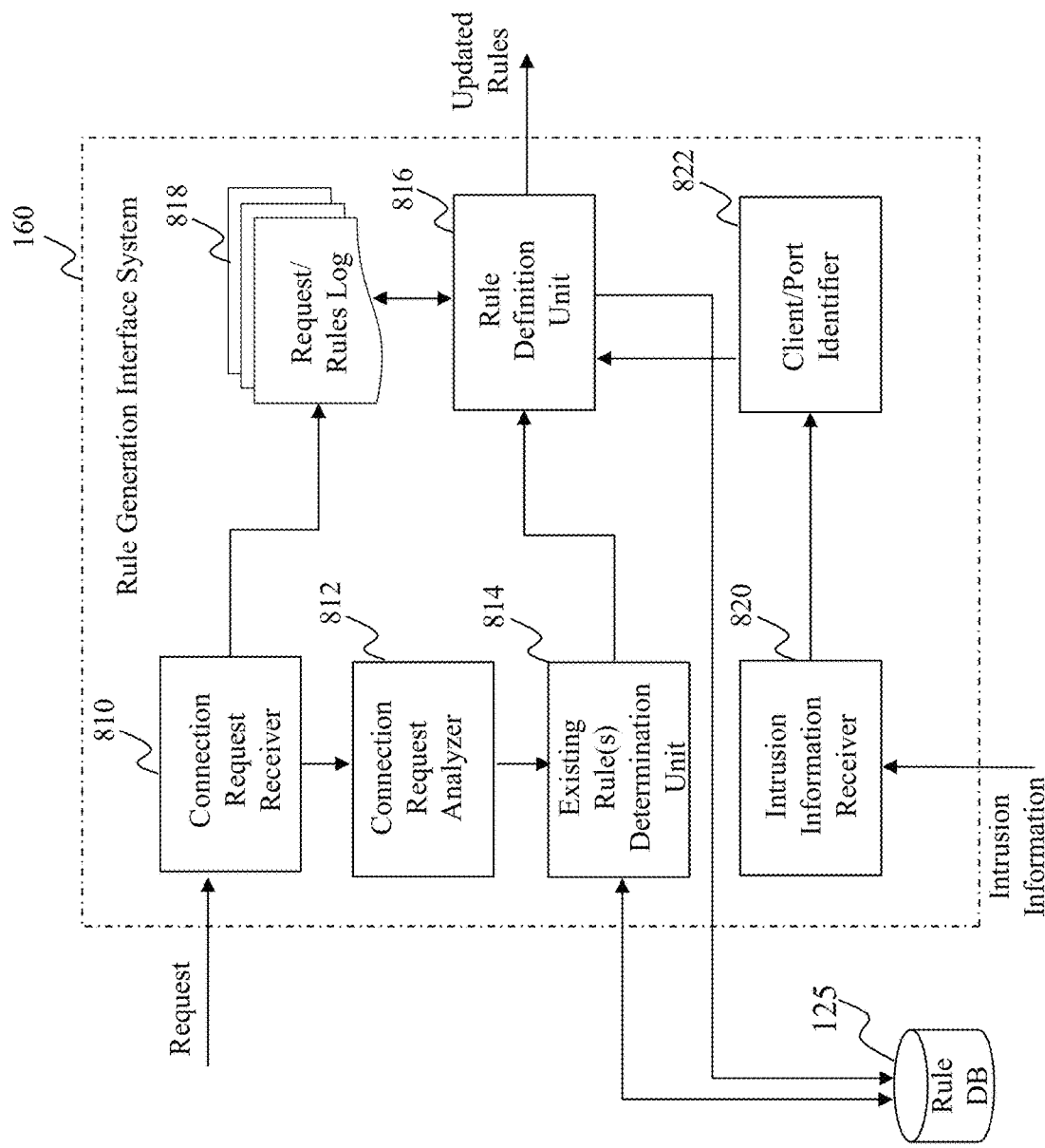
FIG. 8A is an illustrative diagram of an exemplary rule generation interface system, in accordance with various embodiments of the present teaching.

FIG. 8A is an illustrative diagram of an exemplary rule generation interface system, in accordance with various embodiments of the present teaching. Rule generation interface system 160, in the illustrative embodiment, includes a connection request receiver 810, a connection request analyzer 812, an existing rule(s) determination unit 814, and a rule definition unit 816. Furthermore, rule generation interface system 160 may further include an intrusion information receiver 820 and a client/port identifier 822.

Connection request receiver 810 may be configured to receive a request for new and/or updated access control rules. For example, a client device (e.g., client device 120) may submit a request for new rules, or updates to existing rules, which are implemented by the client device. In some embodiments, client device 120 may submit the request periodically, however this need not always be the case. For example, client device 120 may submit a request in response to an abnormal traffic event, as described in greater detail below. Upon receipt of the request, connection request receiver 810 may log the request for the rules within request/rules log 818. Request/rules log 818 may store an indication of each request submitted by each client device within network environment 100 and/or 150.

Connection request analyzer 812 may receive the request from connection request receiver 810. In some embodiments, connection request analyzer 812 may analyze the request to determine what was requested and who submitted the request. For example, connection request analyzer 812 may determine that the request was for new access control rules, and that the request was received from one of client devices 120 (e.g., client device 120-*a*).

After analyzing the request, existing rule(s) determination unit 814 may determine whether any new rules exist for that client device. In one embodiment, existing rule(s) determination unit 814 may determine the current access control rules implemented by the requesting client device. Based on the current access control rules, existing rule(s) determination unit 814 may determine whether new versions/updates for those rules exist. If existing rule(s) determination unit 814 determines that one or more of the requested rules exist, then those rules may be retrieved from rule database 125.

Rule definition unit 816 may be configured to generate the new access control rules and/or generate the updates to existing rules, and may send those rules to rule database 125 for storage. For instance, upon the new rules/updates being generated, the new rules/updates may be stored by rule database 125 such that subsequent requests for those rules may be accessible by existing rule(s) determination unit 814. Rule definition unit 816 may further be configured to output the updated rules, which in turn may be provided to rule optimization and telemetry analysis server 140.

Rule generation interface system 160 may further be configured to receive intrusion information from one or more client devices 120 of networked environment 100, 150. For instance, intrusion information receiver 820 may receive the intrusion information for each client device 120 within networked environment 100. The intrusion information may correspond, in one embodiment, to telemetry data monitored and/or aggregated by the various client devices 120.

In some embodiments, rules generation interface 160 may output one or more global rules prior to release of the optimized rules. The global rules may correspond to one or more enterprise global rules that may affect one or more defaults, such as PERMIT or DENY for a specific protocol (e.g., ICMP). Alternatively or additionally, the global rules may include optimizations, such as a previously generated and employed optimized rule data. Still further, the global rules may include one or more global emergency lockout. In this particular instance, the global locket may specify a certain IP address that is to be blocked from accessing some or all of networked environment 100, 150.

In some embodiments, each data bucket may have a named policy created therefore. A final data bucket may further be generated where rules are assigned that have no destination restriction. Furthermore, an index set of instruction may be generated. The index may allow for a reduction in a number of data buckets that are used, and thus a number of rules that may be examined for a particular incoming data packet. For example, when an incoming data packet is received, each data bucket may be checked to see if the destination of that incoming data packet is in that corresponding data bucket's range. If so, then client device 120 may check the rules included within that data bucket in order to determine whether to allow that data packet to access the network. Additionally, the index set of instructions may include an instruction to check the final data bucket.

Upon receipt of the intrusion information, intrusion information receiver 820 may provide the intrusion information to client/port identifier 822. Client/port identifier 822 may be configured to determine an identifier and/or a port number for the client device that the intrusion information was received from. In the scenario where the intrusion information indicates that an intrusion is occurring, or more generally that a policy violation is detected by/in associated with a client device, client/port identifier 822 may provide the client identifier and/or port number to rule definition unit 816. By doing so, rule definition unit 816 may generate and output a new rule (or rules) indicating a client device to isolate due to suspicious activity.

Figure 8B:
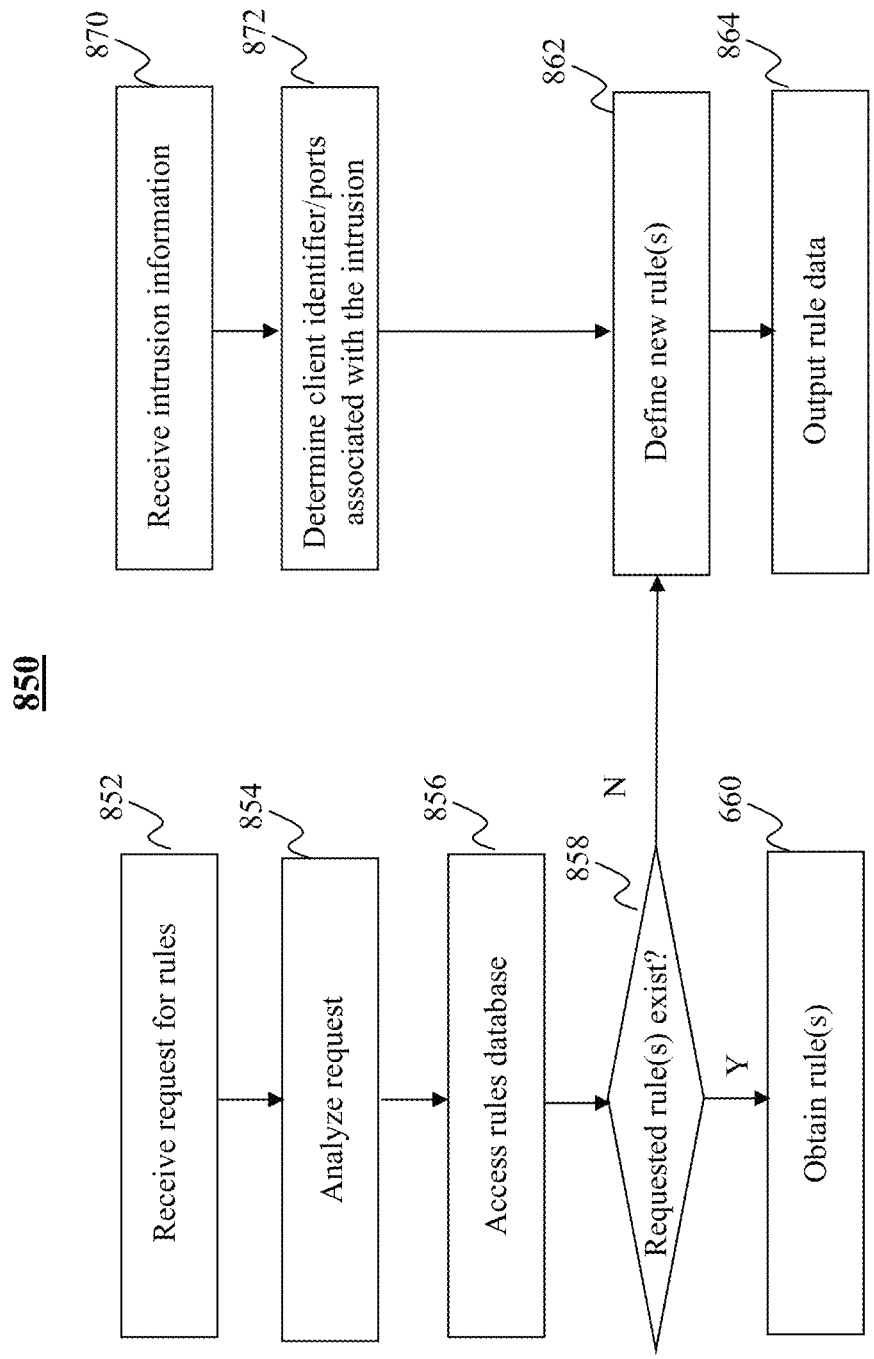
FIG. 8B is an illustrative flowchart of an exemplary process for outputting rule data in response to a request for rules, in accordance with various embodiments of the present teachings.

FIG. 8B is an illustrative flowchart of an exemplary process for outputting rule data in response to a request for rules, in accordance with various embodiments of the present teachings. Process 850, in one embodiment, may begin at step 852. At step 652, a request for rules may be received. For example, the request may be received by connection request receiver 810 from client device 120. At step 854, the request may be analyzed. For example, connection request analyzer 812 may analyze the request and determine what was requested by the client device and/or an identity of the client device that submitted the request. At step 856, a rules database (e.g., rules database 125) may be accessed.

At step 858, a determination may be made as to whether one or more of the requested rules exist. For example, existing rule(s) determination unit 814 may access rules database 125 to determine whether any of the requested rules are stored within rule database 125. If, at step 858, it is determined that the rules do exist, then, at step 860, the requested rules may be obtained. However, if at step 858 it is determined that the requested rules do not exist, then process 850 may proceed to step 862. At step 862, the new rule(s) may be defined. In some embodiments, the new rules may be defined based on the request, however additionally or alternatively, a system may be contacted to generate and provide the new rules. Furthermore, the new rules may include updates to existing rules. At step 864, rule data including the new rules may be output.

In some embodiments, process 850 may alternatively (or additionally) begin at step 870. At step 870, intrusion information may be received. For example, the intrusion information may be received by intrusion information receiver 820, and may indicate a possible intrusion at a client device. At step 872, a client identifier and/or port number associated with the intrusion may be determined. For example, client/port identifier 822 may determine a client identifier and/or port number associated with the client device (e.g., client device 120) that the intrusion information is associated with. Process 850 may then proceed to step 862 where the new rule(s) may be defined. In this particular scenario, the new rule(s) may include a rule isolating the identified client device/port number to prevent further intrusion into the networked environment.

Figure 9A:
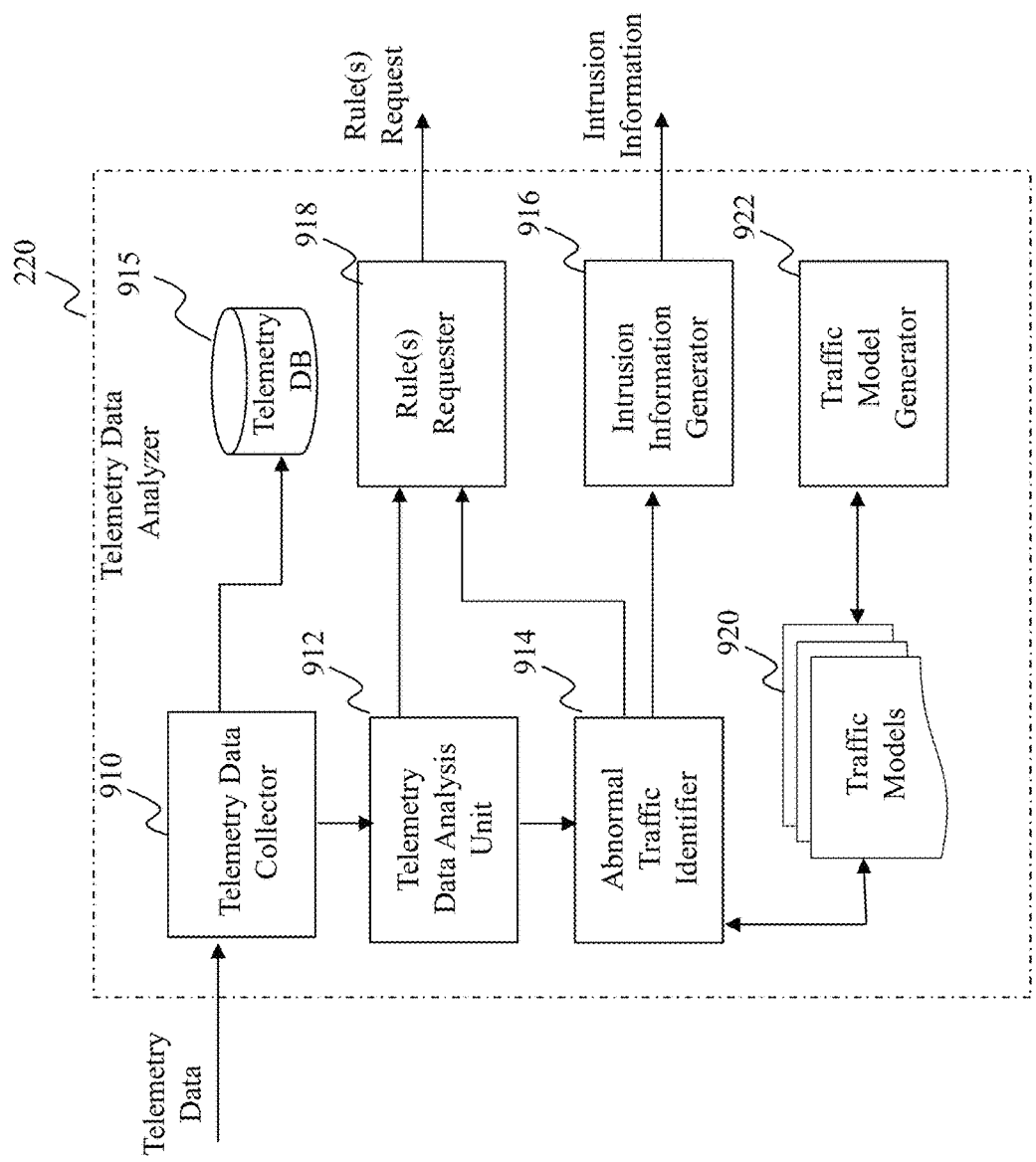
FIG. 9A is an illustrative diagram of an exemplary telemetry data analyzer, in accordance with various embodiments of the present teaching.

FIG. 9A is an illustrative diagram of an exemplary telemetry data analyzer, in accordance with various embodiments of the present teaching. Telemetry data analyzer 220, in the illustrative embodiment, may include a telemetry data collector 910, a telemetry data analysis unit 912, an abnormal traffic identifier 914, a rule(s) requester 918, an intrusion information generator 916, and a traffic model generator 922.

Telemetry data collector 910 may be configured to collect telemetry data from each client device 120 included within networked environment 100, 150. In some embodiments, the telemetry data may be collected at periodic intervals (e.g., hourly, daily, weekly, etc.). Alternatively, however, each client device 120 may be configured to collect and send the telemetry data to telemetry data analyzer 220 in response to a particular traffic condition being detected thereby. For example, client device 120 may send telemetry data to telemetry data analyzer 220 in response to an access control rule violation being detected. Telemetry data collector 910 may store the collected telemetry data in a telemetry database 915. Telemetry database 915, for instance, may store each instance of telemetry data along with various other information such as, and without limitation, a client device identifier associated with the client device that provided the telemetry data, a timestamp from when the telemetry data was received, and one or more settings associated with the client device.

Telemetry data analysis unit 912 may be configured to analyze the telemetry data that was collected by telemetry data collector 910. In one embodiment, telemetry data analysis unit 912 may identify the various access requests received by a corresponding client device associated with the telemetry data. For instance, the telemetry data may indicate which devices associated with the client devices attempted to access which other devices. Furthermore, the telemetry data may indicate which devices were granted access to those other devices, and which devices were denied access.

Abnormal traffic identifier 914 may, in some embodiments, be configured to determine whether the telemetry data represents an abnormal traffic pattern. To do so, abnormal traffic identifier 914 may employ one or more traffic models 920 to compare with the telemetry data. Based on the traffic models 920, abnormal traffic identifier 914 may determine whether any of the traffic detected at the client device is in violation of one or more of the access control rules associated with the client device. If abnormal traffic identifier 914 determines that an abnormal traffic pattern exists, then abnormal traffic identifier 914 may notify intrusion information generator 916. Intrusion information generator 916 may be configured to generate intrusion information, which may in turn be output to, for instance, rule generation interface system 160.

If, however, abnormal traffic identifier 914 determines that the telemetry data does not represent abnormal traffic activity, then a notification of normal traffic patterns may be sent to rule(s) requester 918. Rule(s) requester 918, in some embodiments, may be configured to generate a rule(s) request for the client device. As mentioned above, each client device may periodically submit rule requests for new and/or updated access control rules. In one embodiment, the rule(s) request may be generate in response to submission of telemetry data.

Furthermore, telemetry data analyzer 220 includes traffic model generator 922. Traffic model generator 922 may be in communication with traffic models 920, and may be configured to generate, refine, and/or analyze the various traffic models used by abnormal traffic identifier 914. For example, based on the received telemetry data, traffic model generator 922 may generate an updated or new traffic model harnessing the traffic information of the client devices based on the received telemetry data.

Figure 9B:
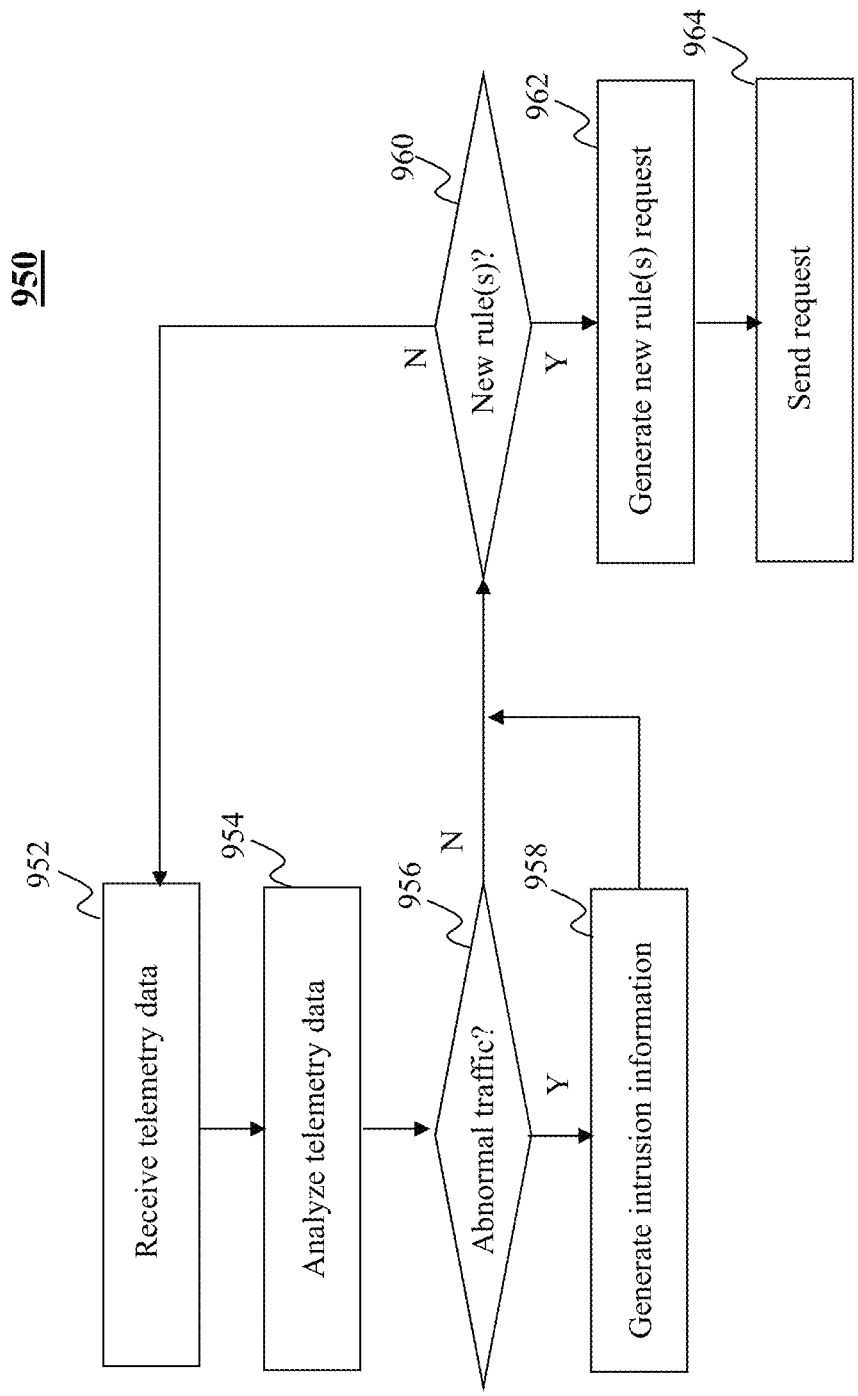
FIG. 9B is an illustrative flowchart of an exemplary process for analyzing telemetry data received from a client device, in accordance with various embodiments of the present teaching.

FIG. 9B is an illustrative flowchart of an exemplary process for analyzing telemetry data received from a client device, in accordance with various embodiments of the present teaching. Process 950, in one embodiment, may begin at step 952. At step 952, telemetry data may be received. For example, telemetry data sent from a client device (e.g., client device 120) may be received by telemetry data collector. In some embodiments, telemetry data from multiple client devices 120 may be received by telemetry data collector 910.

At step 954, the telemetry data may be analyzed. For instance, telemetry data analysis unit 912 may analyze the various instances of telemetry data received by telemetry data collector 910. At step 956, a determination may be made as to whether or not the telemetry data represents abnormal traffic. For example, abnormal traffic identifier 914 may employ one or more traffic models 920 to determine whether the telemetry data represents an abnormal traffic event or abnormal traffic activity detected by one or more client devices 120.

If, at step 956, abnormal traffic identifier 914 determines that the telemetry data represents abnormal traffic, then process 950 may proceed to step 958. At step 958, intrusion information may be generated. For example, intrusion information generator 916 may generate intrusion information indicating that a client device has detected a potential intrusion. Process 950 may then proceed to step 960. If, however, at step 956, abnormal traffic identifier 914 determines that the telemetry data does not represent abnormal traffic, then process 950 may proceed to step 960.

At step 960, a determination may be made as to whether or not one or more new rules (or updates to existing rules) are needed to be generated. For example, if abnormal traffic activity is detected, a new rule may be needed to prevent one or more client devices and/or user devices from access the compromised client device. If new rule(s) is/are needed, then process 950 may proceed from step 960 to step 962. At step 962, a new rule or rules request may be generated. For example, rule(s) requester 918 may generate a rule(s) request. At step 964, the request may be sent. For example, the new rule(s) request may be sent to rule generation interface system 160 for generation of the new rule(s). However, if no new rules are needed, then process 950 may return to step 952, where telemetry data is continually received and analyzed.

Figure 10A:
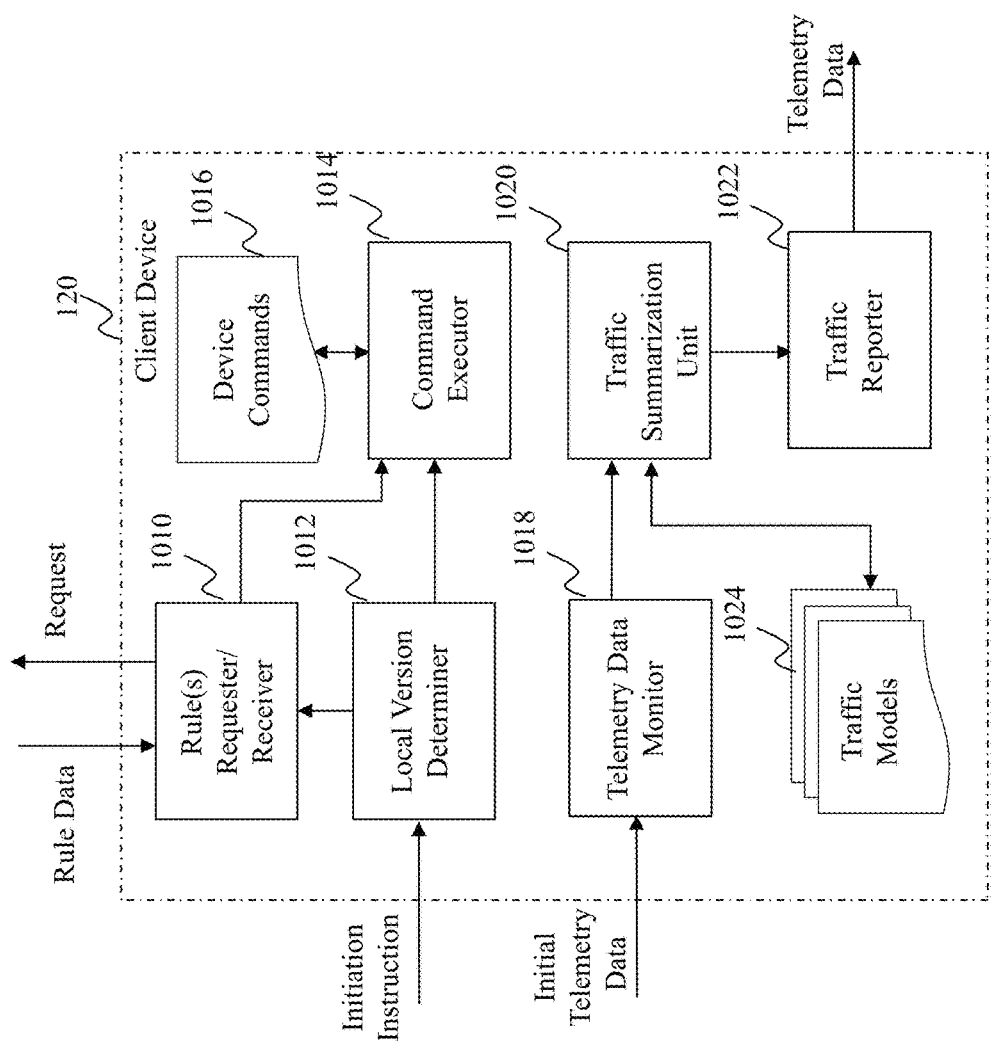
FIG. 10A is an illustrative diagram of one or more modules implemented by an exemplary client device capable of providing telemetry data, in accordance with various embodiments of the present teaching.

FIG. 10A is an illustrative diagram of one or more modules implemented by an exemplary client device capable of providing telemetry data, in accordance with various embodiments of the present teaching. Client device 120 may include, in the illustrative embodiment, a rule(s) requester/receiver 1010, a local version determiner 1012, a command executor 1014, a telemetry data monitor 1018, a traffic summarization unit 1020, and a traffic reporter 1022.

Local version determiner 1012, in one embodiment, may be configured to determine a local version of rules implemented by a client device. For instance, the local version may correspond to a last version of rules obtained from rule generation system 160. The local version may be a number or value representative of a last installed access control list for the client device. Local version determiner 1012 may be configured to receive an initiation instruction to determine the local version. The initiation instruction may be generated by client device 120 periodically such that the local version determiner 1012 is prompted to identify the current version of the client device's access control list periodically.

Rule requester/receiver 1010 may be configured, in response to local version determiner 1012 determine a current version of the rules for the client device, sent a request to server 140. As mentioned above, server 140 may determine whether the version of rules currently implemented by the client device is the most up to date version of those rules. In some embodiments, the request may correspond to an API call to server 140 that includes the client device's current rules version and an IP address of the client device. Rule requester/receiver 1010 may further receive a response back from server 140. The response may include information about whether the client device's rules are current, a current rule version, and any additional information capable of being used to install the rules on the client device. If the response did include rule data represented rules to be installed, then command executor may be employed to install the rule data.

Command executor 1014 may execute one or more command functions to initiate the rule data. The one or more commands may be based on device commands 1016 associated with the particular device (e.g., client device 120), a device operating system ("OS"), device firmware, and the like. For example, client device 120 may receive the rule data, which may include an IP table and IP set, as well as install commands, and may install the IP table and IP set using the install commands. As an illustrative example, device commands 1016 may include a UNIX utility command, which may be used to run the install commands. By running these commands, the access control rules included within the IP table may be installed on client device 120. In some embodiments, prior to installation, one or more verification processes may be performed, as known to those of ordinary skill in the art.

Telemetry data monitor 1018 may be configured, in one embodiment, to receive initial telemetry data from devices interacting with client device 120. The initial telemetry data may reflect the various requests received from different user devices associated with client device 120. The initial telemetry data may be provided to traffic summarization unit 1020, which may aggregate the initial telemetry data using one or more traffic models 1024. In some embodiments, traffic models 1024 may be substantially similar to traffic models 920 of FIG. 9A, and the previous description may apply. Upon summarizing the initial telemetry data, traffic reporter 1022 may output the telemetry data to telemetry data analyzer 220 of rule optimization and telemetry analysis server 140.

Figure 10B:
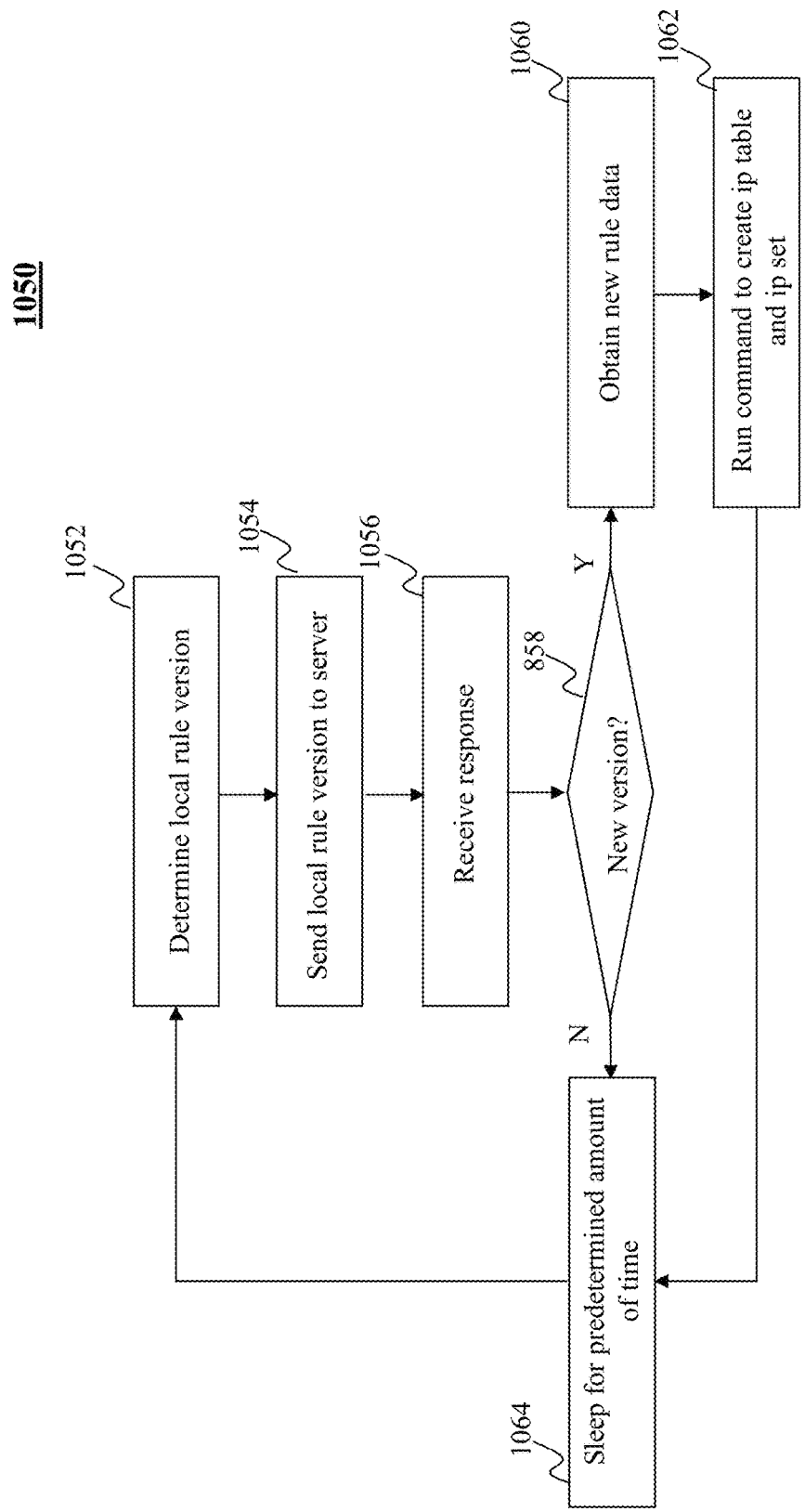
FIG. 10B is an illustrative flowchart of an exemplary process for executing a command to create an IP table and IP set on a client device, in accordance with various embodiments of the present teaching.

FIG. 10B is an illustrative flowchart of an exemplary process for executing a command to create an IP table and IP set on a client device, in accordance with various embodiments of the present teaching. Process 1050, in a non-limiting embodiment, may begin at step 1052. At step 1052, a local rule version may be determined. For instance, local version determiner 1012 may determine a current version of access control rules installed on client device 120. At step 1054, a request may be sent to server 140 including the local rule version. For instance, rule(s) requester/receiver 1010 may send the request. At step 1056, a response may be received. Rule(s) requester/receiver 1010 may further receive request. At step 1058, a determination may be made as to whether the local version is current. If so, then process 1050 may proceed to step 1060. At step 1060, the new rule data may be obtained. The new rule data, in some embodiments, may be received along with the information indicating the current rule version from server 140. At step 1062, one or more commands may be run to install IP table and IP rule set. For instance, command executor 1014 may execute one or more device commands to install the rule data on client device 120. After step 1062, process 1050 may proceed to step 1064. If, at step 1058, it determined that the local version of the rules is current, then process 1050 may proceed to step 1064. At step 1064, the client device may sleep for a predetermined amount of time. After the predetermined amount of time has elapsed, process 1050 may return to step 1052, where the process may loop.

Figure 10C:
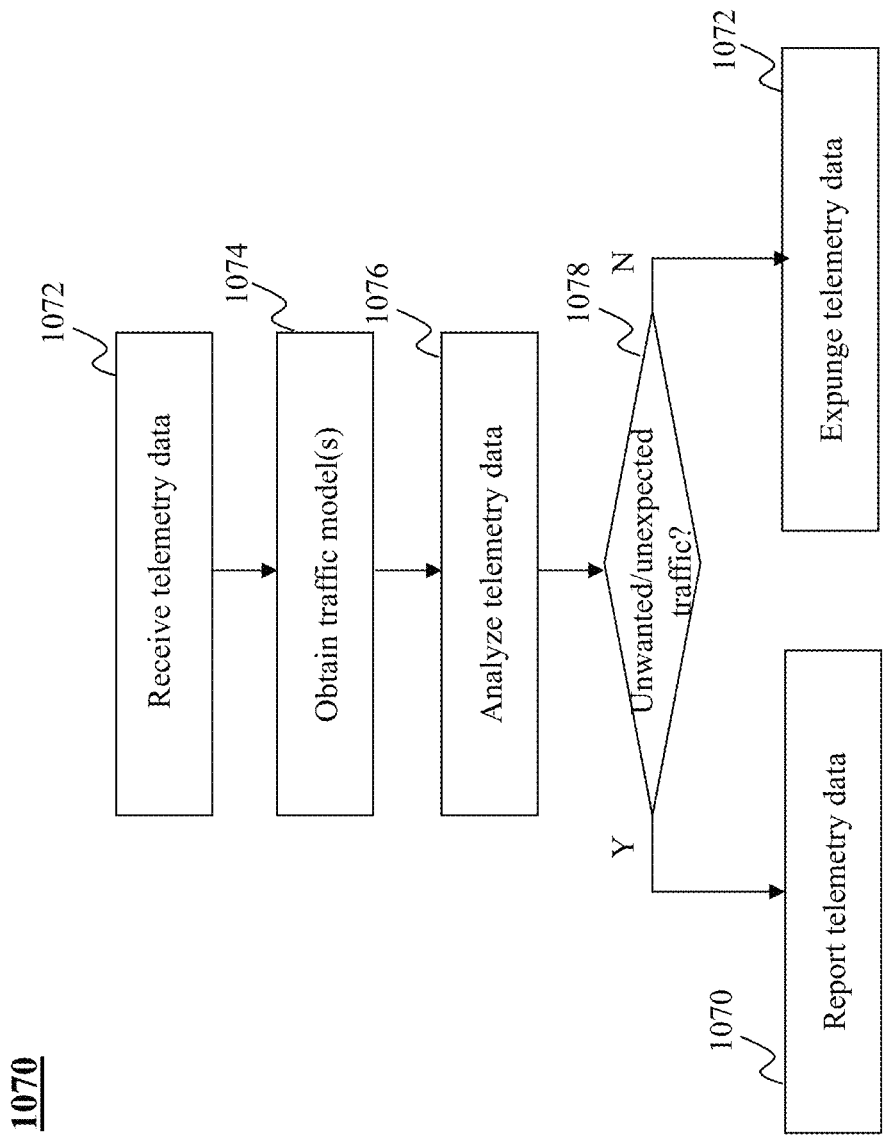
FIG. 10C is an illustrative flowchart of an exemplary process for analyzing telemetry data, in accordance with various embodiments of the present teaching.

FIG. 10C is an illustrative flowchart of an exemplary process for analyzing telemetry data, in accordance with various embodiments of the present teaching. Process 1070, in one embodiment, may begin at step 1072. At step 1072, telemetry data may be received. For instance, telemetry data monitor 1018 may receive initial telemetry data from one or more user devices 110 associated with client device 120. At step 1074, one or more traffic models may be obtained. For instance, one or more traffic models 1024 may be obtained by traffic summarization unit 1020. At step 1076, the telemetry data may be analyzed. For example, traffic summarization unit 1020 may analyze the initial telemetry data using the one or more traffic models 1024.

At step 1078, a determination may be made as to whether the initial telemetry data corresponds to unwanted/unexpected traffic. For instance, the determination may be made by traffic summarization unit 1020 based on the one or more traffic models 1024. If, at step 1078, it is determined that the initial telemetry data does not reflect unwanted/unexpected traffic, then process 1070 may proceed to step 1082, where the initial telemetry data is expunged. However, persons of ordinary skill in the art will recognize that in some embodiments, telemetry data that does not represent unwanted/unexpected traffic may be stored with an indicator indicating that the particular instance of telemetry data represents normal traffic. If, at step 1078, it is determined that the initial telemetry data does represent unwanted/unexpected traffic, then process 1070 may proceed to step 1080. At step 1080, the telemetry data may be reported to rule optimization and telemetry analysis server 140. For example, traffic reporter 1022 may report the telemetry data to rule optimization and telemetry analysis server 140.

Figure 11A:
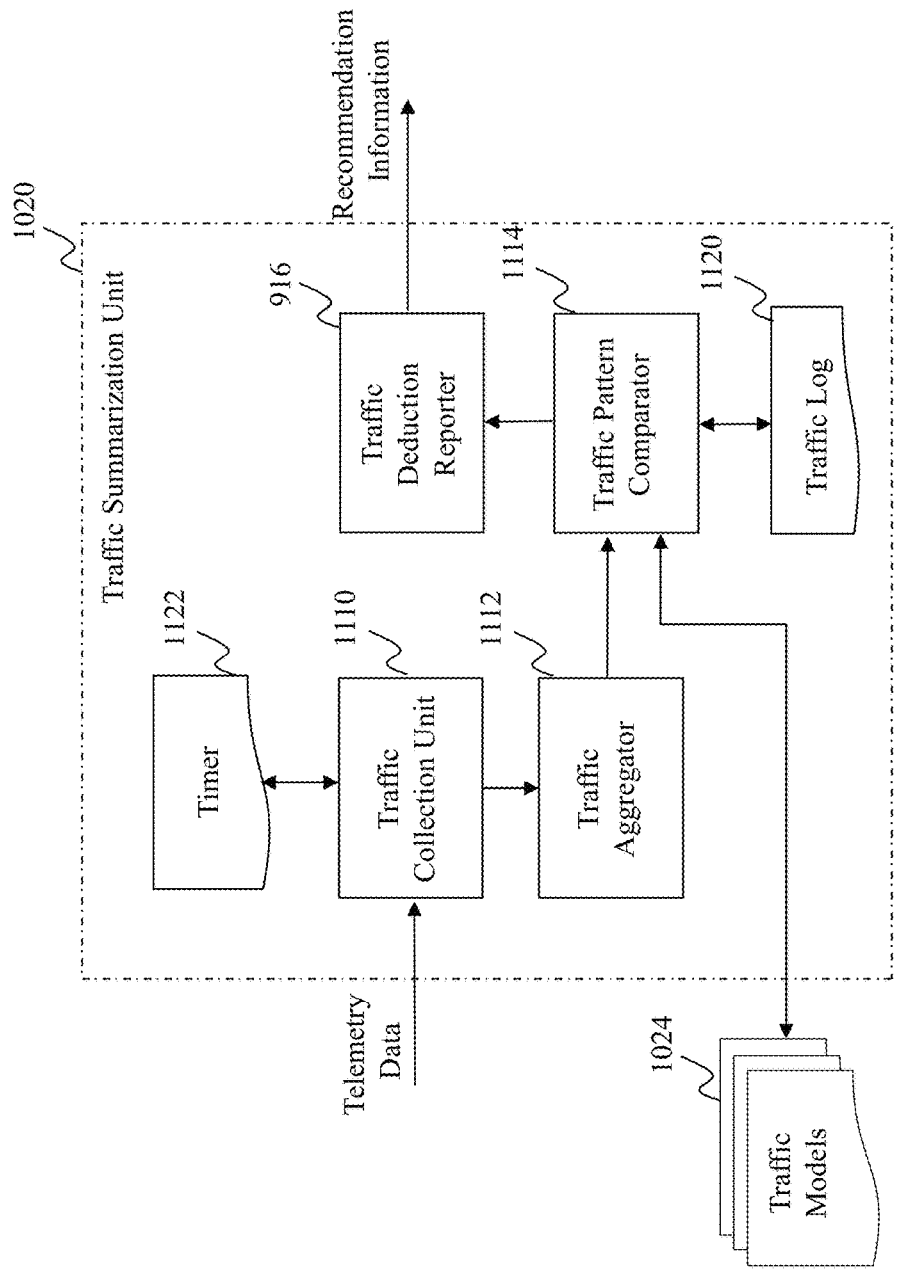
FIG. 11A is an illustrative diagram of an exemplary traffic summarization unit, in accordance with various embodiments of the present teaching.

FIG. 11A is an illustrative diagram of an exemplary traffic summarization unit, in accordance with various embodiments of the present teaching. Traffic summarization unit 1020, in a non-limiting embodiment, may include a traffic collection unit 1110, a traffic aggregator 1112, a traffic deduction reporter 1016, and a traffic pattern comparator 1014.

Traffic collection unit 1110 may be configured to receive the telemetry data obtained by telemetry data monitor 1018. Upon receipt of the telemetry data, traffic collection unit 1110 may initiate a timer 1122. Timer 1122 may log an amount of time that has elapsed since the telemetry data was received in order to initiate future rule requests. The collected telemetry data may be aggregated by traffic aggregator 1112 to determine a total traffic pattern detected by client device 120.

The aggregated traffic may then be provided to traffic pattern comparator 1014. Traffic pattern comparator 1014, in one embodiment, may employ traffic model(s) 1024 to determine whether the traffic detected by client device 120 is abnormal. The result(s) of the comparison of the received telemetry data represented the traffic flow associated with client device 120 may be provided to traffic deduction reporter 1016. Traffic deduction reporter 1016 may determine, based on the comparison, whether or not the traffic corresponds to unexpected/unwanted traffic, indicating a likelihood of an intrusion/policy violation. Based on the determination, traffic deduction reporter 916 outputs recommendation information indicating whether an intrusion is detected (e.g., outputs intrusion information) or whether normal traffic is detected. Furthermore, the various traffic comparisons performed by traffic pattern comparator 1014 may be logged by traffic log 1120. This may allow a system administrator to view the various comparisons performed by client device 120 for future analysis and review.

Figure 11B:
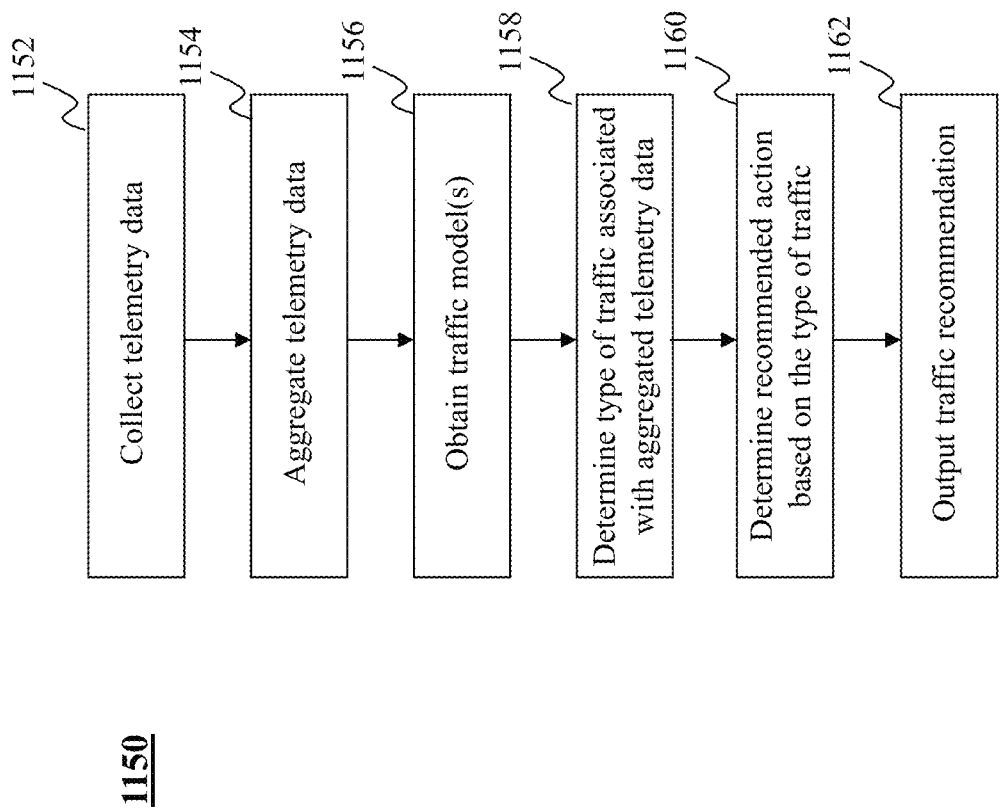
FIG. 11B is an illustrative flowchart of an exemplary process for determining traffic recommendations, in accordance with various embodiments of the present teaching.

FIG. 11B is an illustrative flowchart of an exemplary process for determining traffic recommendations, in accordance with various embodiments of the present teaching. Process 1150 may begin, in a non-limiting embodiment, at step 1152. At step 1152, telemetry data may be collected. For instance, traffic collection unit 1110 may collect the telemetry data of client device 120. At step 1154, the telemetry data may be aggregated. For instance, traffic aggregator 1112 may aggregate the collected telemetry data for each user device 110 associated with client device 120. At step 1156, one or more traffic models may be obtained. For instance, traffic model(s) 1024 may be obtained by traffic pattern comparator 1014. At step 1158, a type of traffic associated with the aggregated telemetry data may be determined. For instance, a determination may be made by traffic pattern comparator 1014 and/or traffic deduction reporter 1016 as to whether or not the telemetry data represents unwanted/unexpected traffic (e.g., abnormal traffic activity) or normal traffic. At step 1160, a recommendation action may be determined based on the type of traffic that was determined at step 1158. For example, traffic deduction reporter 1016 may determine whether intrusion information is to be generated, indicating the likelihood of an intrusion attempt, or whether a normal traffic status is to be generated. At step 1162, the traffic recommendation may be output.

Figure 12:
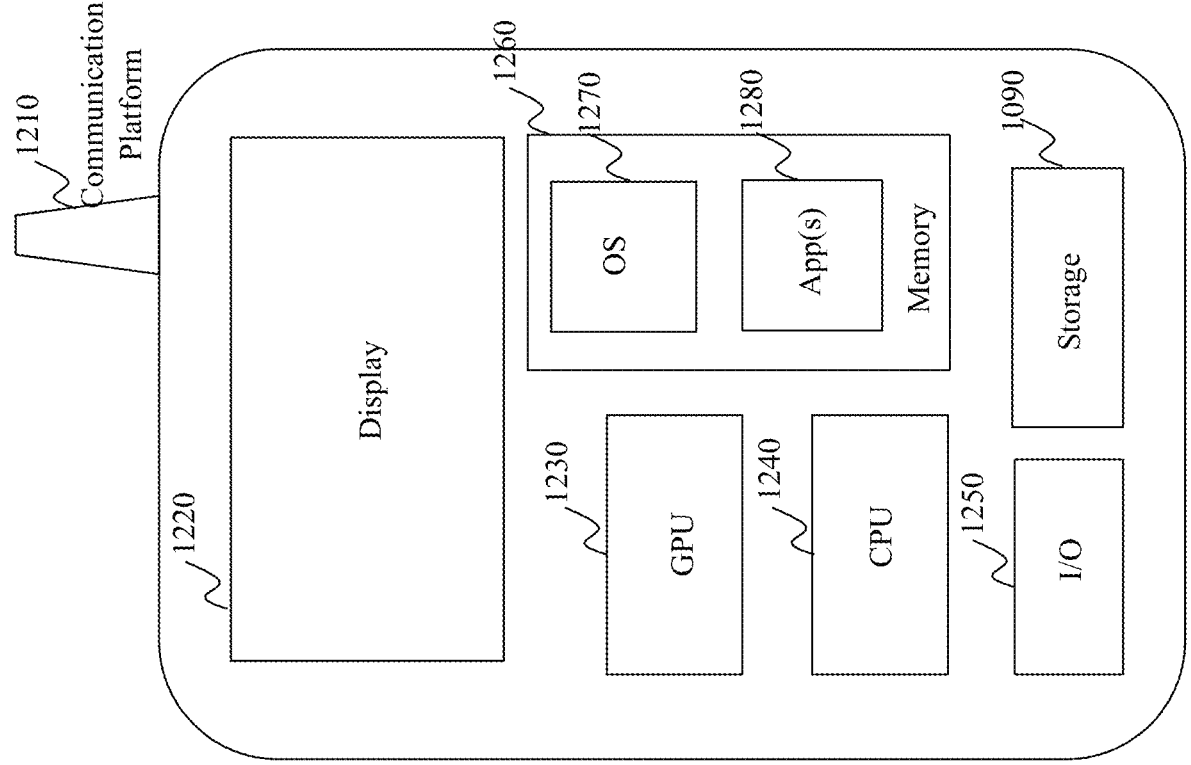
FIG. 12 is an illustrative diagram of an exemplary mobile device architecture that may be used to realize a specialized system implementing the present teaching in accordance with various embodiments.

FIG. 12 is an illustrative diagram of an exemplary mobile device architecture that may be used to realize a specialized system implementing the present teaching in accordance with various embodiments. In this example, the user device on which the fraudulent network detection systems and methods is implemented corresponds to a mobile device 1000, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1200 may include one or more central processing units ("CPUs") 1240, one or more graphic processing units ("GPUs") 1230, a display 1220, a memory 1260, a communication platform 1210, such as a wireless communication module, storage 1290, and one or more input/output (I/O) devices 1240. Any other suitable component, including but not limited to a system bus or a controller (not shown), may also be included in the mobile device 1200. As shown in FIG. 12, a mobile operating system 1270 (e.g., iOS, Android, Windows Phone, etc.), and one or more applications 1280 may be loaded into memory 1260 from storage 1290 in order to be executed by the CPU 1240. The applications 1280 may include a browser or any other suitable mobile apps for determining fraudulent networks on mobile device 1200. User interactions with the content may be achieved via the I/O devices 1240 and provided to the rule optimization and telemetry analysis server 140 via network(s) 130.

To implement various modules, units, and their functionalities described in the present disclosure, computer hardware platforms may be used as the hardware platform(s) for one or more of the elements described herein (e.g., rule optimization and telemetry analysis server 140). The hardware elements, operating systems and programming languages of such computers are conventional in nature, and it is presumed that those skilled in the art are adequately familiar therewith to adapt those technologies to detect fraudulent networks as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 13:
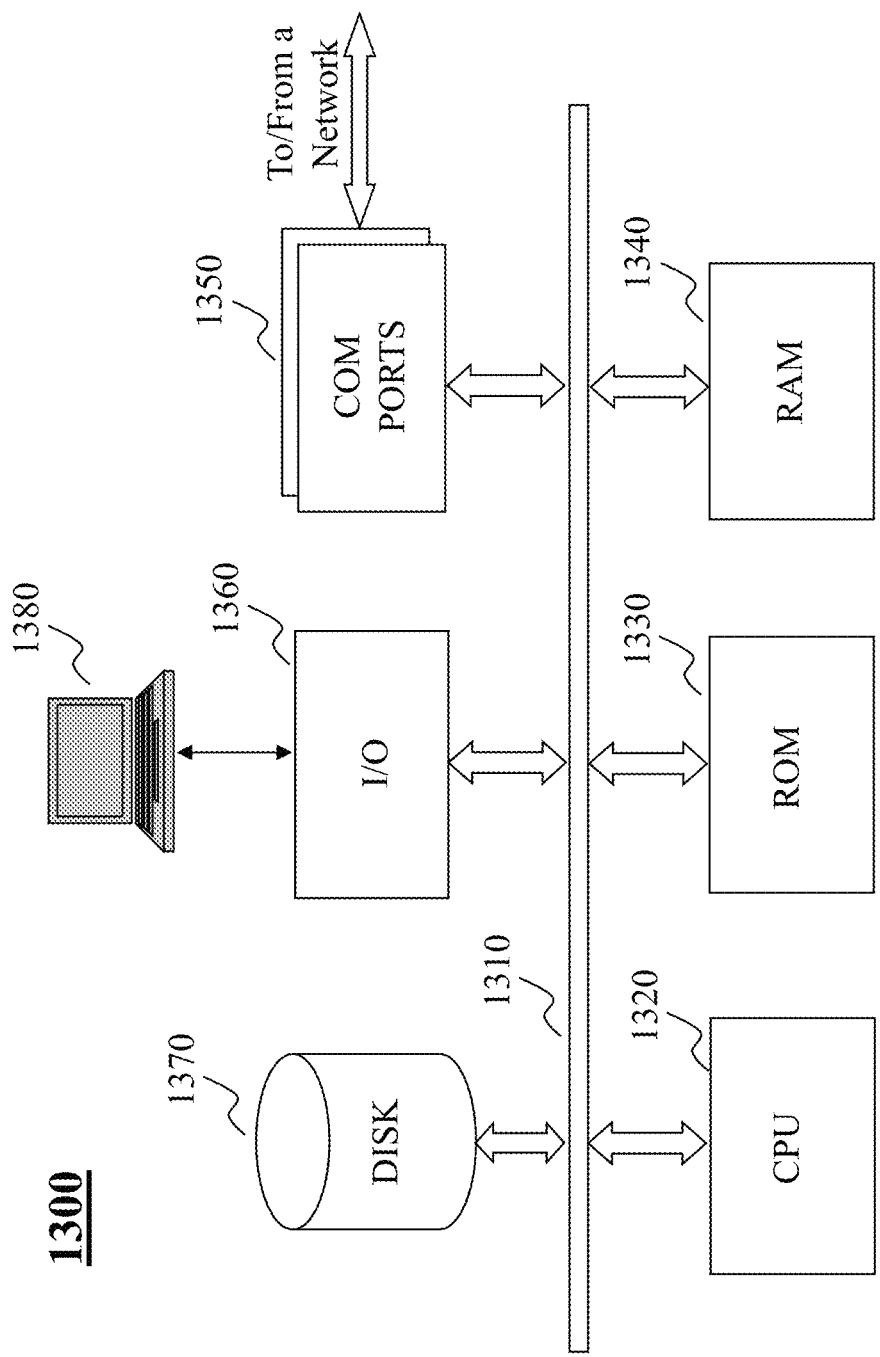
FIG. 13 is an illustrative diagram of an exemplary computing device architecture that may be used to realize a specialized system implementing the present teaching in accordance with various embodiments.

FIG. 13 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1300 may be used to implement any component of fraudulent network detection techniques, as described herein. For example, fraudulent network detection system may be implemented on a computer such as computer 1300, via its hardware, software program, firmware, or a combination thereof. Although only one such computer is shown, for convenience, the computer functions relating to fraudulent network detection as described herein may be implemented in a distributed fashion on a number of similar platforms, to distribute the processing load.

Computer 1300, for example, includes COM ports 1350 connected to and from a network connected thereto to facilitate data communications. Computer 1300 also includes a central processing unit (CPU) 1320, in the form of one or more processors, for executing program instructions. The exemplary computer platform includes an internal communication bus 1310, program storage and data storage of different forms (e.g., disk 1370, read only memory (ROM) 1330, or random access memory (RAM) 1340), for various data files to be processed and/or communicated by computer 1300, as well as possibly program instructions to be executed by CPU 1320. Computer 1300 also includes an I/O component 1360, supporting input/output flows between the computer and other components therein such as user interface elements 1380. Computer 1300 may also receive programming and data via network communications.

Hence, aspects of the methods of detecting fraudulent networks and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with detection fraudulent networks. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communications circuitry connected to a network for providing optimized access control rules, the method comprising:
   receiving a request from a client device;
   determining, based on the request, that an update is needed for access control rule information for the client device;
   generating rule data comprising a plurality of data buckets each comprising one or more access control rules, each data bucket of the plurality being associated with a range of destination port numbers, and wherein each of the one or more access control rules comprise a set of tuples having a common source network and source port number, and one or more destination port numbers associated with the common source network and source port number; and
   sending the rule data to the client device.

2. The method of claim 1, wherein generating the rule data comprises:
   identifying at least one group of subnets that one or more Internet Protocol ("IP") addresses associated with the client device belong to;
   determining one or more associated access control rules that are applicable to each of the at least one group of subnets; and
   generating temporary rule data representing one or more temporary access control rules, each of the one or more temporary access control rules indicating at least: a protocol associated with the temporary access control rule, a corresponding source IP address that the temporary access control rule is applicable for, a corresponding source port number range for the corresponding source IP address, a destination IP address from the one or more IP addresses, and a destination port number range associated with the destination IP address.

3. The method of claim 2, further comprising:
   generating, from the temporary rule data, one or more tuples, where each of the one or more tuples comprise at least one of the one or more temporary access control rules that includes a same protocol, a same destination IP address, and a same destination port number; and generating one or more rule sets each comprising at least one of the one or more tuples that includes a same corresponding source IP address.

4. The method of claim 3, further comprising:
determining, from the one or more rule sets, each source IP address having the same destination port number; and
generating at least one combined rule set, wherein each combined rule set includes a first access control rule specifying the corresponding source IP address for the first access control rule and each destination port number range associated with the corresponding source IP address.

5. The method of claim 4, further comprising:
determining a number of rule sets for the at least one combined rule set; and
determining a segmentation parameter for generating the plurality of data buckets, the segmentation parameter being determined based on the number of rule sets and the destination port number associated with the at least one combined rule set such that the plurality of data buckets are generated using the segmentation parameter.

6. The method of claim 1, further comprising:
receiving an incoming data packet;
determining a destination port number associated with the incoming data packet;
determining a first data bucket of the plurality of data buckets associated with the destination port number; and
processing the incoming data packet using at least one of the one or more access control rules that the first data bucket includes.

7. The method of claim 1, further comprising:
receiving an incoming data packet;
determining a destination port number associated with the incoming data packet;
selecting a first data bucket of the plurality of data buckets, the first data bucket being associated with a first range of destination port numbers;
determining that the destination port number is absent from within the first range of destination port numbers; and
selecting a second data bucket of the plurality of data buckets, the second data bucket being associated with a second range of destination port numbers distinct from the first range of destination port numbers; and
determining whether the destination port number is included within the second range of destination port numbers.

8. A system including at least one processor, memory, and communications circuitry connected to a network for providing optimized access control rules, the system comprising:
a request receiver configured to receive a request from a client device;
an update availability determiner configured to determine, based on the request, that an update is needed for access control rule information for the client device;
a rule generation system configured to generate rule data comprising a plurality of data buckets each comprising one or more access control rules, each data bucket of the plurality being associated with a range of destination port numbers, and wherein each of the one or more access control rules comprises a set of tuples having a common source network and source port number, and one or more destination port numbers associated with the common source network and source port number; and
a transmission unit configured to send the rule data to the client device.

9. The system of claim 8, wherein the rule generation system further comprises:
an IP group identifier configured to identify at least one group of subnets that one or more Internet Protocol ("IP") addresses associated with the client device belong to;
a group rule identifier configured to determine one or more associated access control rules that are applicable to each of the at least one group of subnets; and
a temporary rule generator configured to generate temporary rule data representing one or more temporary access control rules, each of the one or more temporary access control rules indicating at least: a protocol associated with the temporary access control rule, a corresponding source IP address that the temporary access control rule is applicable for, a corresponding source port number range for the corresponding source IP address, a destination IP address from the one or more IP addresses, and a destination port number range associated with the destination IP address.

10. The system of claim 9, wherein the rule generation system further comprises a rule optimization system, the rule optimization system including:
a first optimization unit configured to:
generate, from the temporary rule data, one or more tuples, where each of the one or more tuples comprises at least one of the one or more temporary access control rules that includes a same protocol, a same destination IP address, and a same destination port number, and
generate one or more rule sets each comprising at least one of the one or more tuples that includes a same corresponding source IP address.

11. The system of claim 10, wherein the rule optimization system further comprises:
a second optimization unit configured to:
determine, from the one or more rule sets, each source IP address having the same destination port number, and
generate at least one combined rule set, wherein each combined rule set includes a first access control rule specifying the corresponding source IP address for the first access control rule and each destination port number range associated with the corresponding source IP address.

12. The system of claim 11, wherein the rule optimization system further comprises:
a third optimization unit configured to:
determine a number of rule sets for the at least one combined rule set, and
determine a segmentation parameter for generating the plurality of data buckets, the segmentation parameter being determined based on the number of rule sets and the destination port number associated with the at least one combined rule set, such that the plurality of data buckets are generated using the segmentation parameter.

13. The system of claim 8, further comprising a telemetry data analyzer configured to:
receive an incoming data packet;
determine a destination port number associated with the incoming data packet;

determine a first data bucket of the plurality of data buckets associated with the destination port number; and process the incoming data packet using at least one of the one or more access control rules that the first data bucket includes.

14. The system of claim 8, further comprising a telemetry data analyzer configured to:
receive an incoming data packet;
determine a destination port number associated with the incoming data packet;
select a first data bucket of the plurality of data buckets, the first data bucket being associated with a first range of destination port numbers;
determine that the destination port number is absent from within the first range of destination port numbers; and
select a second data bucket of the plurality of data buckets, the second data bucket being associated with a second range of destination port numbers distinct from the first range of destination port numbers; and
determine whether the destination port number is included within the second range of destination port numbers.

15. A non-transitory computer readable medium comprising instructions that, when executed by at least one processor of a computing device, cause the computing device to:
receive a request from a client device;
determine, based on the request, that an update is needed for access control rule information for the client device;
generate rule data comprising a plurality of data buckets each comprising one or more access control rules, each data bucket of the plurality being associated with a range of destination port numbers, and wherein each of the one or more access control rules comprises a set of tuples having a common source network and source port number, and one or more destination port numbers associated with the common source network and source port number; and
send the rule data to the client device.

16. The non-transitory computer readable medium of claim 15, wherein the instructions associated with the rule data being generated, when read by the at least one processor, cause the computing device to:
identify at least one group of subnets that one or more Internet Protocol ("IP") addresses associated with the client device belong to;
determine one or more associated access control rules that are applicable to each of the at least one group of subnets; and
generate temporary rule data representing one or more temporary access control rules, each of the one or more temporary access control rules indicating at least: a protocol associated with the temporary access control rule, a corresponding source IP address that the temporary access control rule is applicable for, a corresponding source port number range for the corresponding source IP address, a destination IP address from the one or more IP addresses, and a destination port number range associated with the destination IP address.

17. The non-transitory computer readable medium of claim 16, wherein the instructions, when read by the at least one processor, further cause the computing device to:
generate, from the temporary rule data, one or more tuples, where each of the one or more tuples comprises at least one of the one or more temporary access control rules that includes a same protocol, a same destination IP address, and a same destination port number; and
generate one or more rule sets each comprising at least one of the one or more tuples that includes a same corresponding source IP address.

18. The non-transitory computer readable medium of claim 17, wherein the instructions, when read by the at least one processor, further cause the computing device to:
determine, from the one or more rule sets, each source IP address having the same destination port number; and
generate at least one combined rule set, wherein each combined rule set includes a first access control rule specifying the corresponding source IP address for the first access control rule and each destination port number range associated with the corresponding source IP address.

19. The non-transitory computer readable medium of claim 18, wherein the instruction, when read by the at least one processor, further cause the computing device to:
determine a number of rule sets for the at least one combined rule set; and
determine a segmentation parameter for generating the plurality of data buckets, the segmentation parameter being determined based on the number of rule sets and the destination port number associated with the at least one combined rule set, such that the plurality of data buckets are generated using the segmentation parameter.

20. The non-transitory computer readable medium of claim 15, wherein the instruction, when read by the at least one processor, further cause the computing device to:
determine a destination port number associated with an incoming data packet;
select a first data bucket of the plurality of data buckets, the first data bucket being associated with a first range of destination port numbers;
determine that the destination port number is absent from within the first range of destination port numbers; and
select a second data bucket of the plurality of data buckets, the second data bucket being associated with a second range of destination port numbers distinct from the first range of destination port numbers; and
determining whether the destination port number is included within the second range of destination port numbers.

* * * * *